(12) United States Patent
Galloway

(10) Patent No.: US 9,303,424 B1
(45) Date of Patent: Apr. 5, 2016

(54) HUNTING BLIND

(71) Applicant: HARD CORE BRANDS INTERNATIONAL LLC, Ottawa, IL (US)

(72) Inventor: Michael James Galloway, Chardon, OH (US)

(73) Assignee: HARD CORE BRANDS INTERNATIONAL LLC, Ottawa, IL (US)

( * ) Notice: Subject to any disclaimer, the term of this patent is extended or adjusted under 35 U.S.C. 154(b) by 66 days.

(21) Appl. No.: 14/204,803

(22) Filed: Mar. 11, 2014

Related U.S. Application Data

(60) Provisional application No. 61/780,091, filed on Mar. 13, 2013.

(51) Int. Cl.
*E04H 15/02* (2006.01)
*B63B 17/02* (2006.01)
*E04H 15/00* (2006.01)

(52) U.S. Cl.
CPC .............. *E04H 15/001* (2013.01); *B63B 17/02* (2013.01); *E04H 15/02* (2013.01); *Y10S 135/901* (2013.01)

(58) Field of Classification Search
CPC ....... E04H 15/48; E04H 15/001; E04H 15/02; E04H 15/34; E04H 15/58; A01M 31/025; Y10S 135/901; B63B 35/00; B63B 17/02
USPC ......... 135/143–144, 148–149, 151, 157–160, 135/116, 900–901; 43/1–3; 114/295, 351, 114/353, 364, 361
See application file for complete search history.

(56) References Cited

U.S. PATENT DOCUMENTS

| | | | |
|---|---|---|---|
| 4,077,418 A * | 3/1978 | Cohen | 135/95 |
| 4,106,145 A * | 8/1978 | Gillen et al. | 114/351 |
| 4,716,919 A * | 1/1988 | Griffin | 135/133 |
| 4,751,936 A | 6/1988 | Zibble et al. | |
| 5,458,079 A * | 10/1995 | Matthews et al. | 114/351 |
| 5,462,330 A * | 10/1995 | Brown | 296/172 |
| 5,615,633 A * | 4/1997 | Cripe | 114/351 |
| 5,647,159 A | 7/1997 | Latschaw | |
| D392,935 S | 3/1998 | Cripe | |
| 5,762,085 A | 6/1998 | Punch | |
| 5,842,495 A * | 12/1998 | Egnew et al. | 135/133 |
| D405,890 S | 2/1999 | Latschaw | |
| 5,887,539 A | 3/1999 | Rex et al. | |
| 6,016,823 A * | 1/2000 | Hill | 135/124 |
| 6,694,995 B1 | 2/2004 | Ransom | |

(Continued)

OTHER PUBLICATIONS

"Killzone Lay 'n Slay Waterfowl Hunting Blind Setup Instruction Video," YouTube, Nov. 16, 2009, https://www.youtube.com/watch?v=DZmoqDCkno4.

(Continued)

*Primary Examiner* — Winnie Yip
(74) *Attorney, Agent, or Firm* — Rankin, Hill & Clark LLP

(57) ABSTRACT

A one man or two man layout hunting blind that can be folded into a compact transportable condition and that is easily assembled or deploy in the field, the layout hunting blind having a head end and a foot end with an inner frame assembly that does not extend to the foot end, the inner frame assembly including a combination of inner folding assemblies and locking sleeves that make the blind easy to deploy in the field.

24 Claims, 21 Drawing Sheets

(56) References Cited

U.S. PATENT DOCUMENTS

| | | |
|---|---|---|
| 6,698,131 B2 | 3/2004 | Latschaw |
| 6,769,379 B2 * | 8/2004 | Foiles ............... 114/351 |
| 7,063,035 B2 * | 6/2006 | Belcher ............... 114/351 |
| 7,237,283 B2 | 7/2007 | Devries |
| D572,371 S | 7/2008 | Desouche et al. |
| 7,549,434 B2 | 6/2009 | Bean |
| D658,779 S | 5/2012 | Sovereign |
| D712,994 S | 9/2014 | Larson |
| 8,936,036 B2 * | 1/2015 | Parsons ............... 135/117 |
| 2004/0000084 A1 | 1/2004 | Latschaw |
| 2004/0231221 A1 | 11/2004 | Latschaw |
| 2005/0055894 A1 | 3/2005 | DeVries |
| 2007/0221114 A1 * | 9/2007 | Schaaf ............... 114/361 |
| 2007/0221261 A1 | 9/2007 | Bean |
| 2011/0126873 A1 | 6/2011 | Desouches et al. |
| 2013/0146113 A1 | 6/2013 | Hawk, III et al. |
| 2013/0291916 A1 | 11/2013 | Parsons |

OTHER PUBLICATIONS

"Tanglefree Deadzone Layout Blind," Canadian Waterfowl Supplies, 2014, http://www.canadianwaterfowlsupplies.com/products/tanglefree-dead-zone-layout-blind.

* cited by examiner

HUNTING BLIND

This application claims priority in provisional patent application Ser. No. 61/780,091 that was filed on Mar. 13, 2013, which is incorporated by reference herein.

The invention of this application relates to hunting blinds and, more particularly, to a hunting blind configuration that can be used in a one-man blind format and more than one-man format, such as a two-man blind.

BACKGROUND OF THE INVENTION

Hunting blinds have been known in the industry for many years and have been found to be effective to allow hunters to hide themselves from the game being hunted. However, prior art hunting blinds have been found to be difficult to transport into the field and even more difficult to assemble in the field. Further, hunting blinds currently in use also suffer from structural issues wherein attempts to make the hunting blind lightweight have resulted in hunting blinds with inferior structural characteristics that can be easily broken and/or damaged.

Layout Hunting Blinds

More recently, a new hunting blind design has been introduced into this field wherein the hunter is either sitting or laying within the blind and shoots from the top side of the blind both of these will be referred to as a layout hunting blind. This differs from earlier designs wherein the blinds were taller and often one-sided wherein the hunter would shoot over or though the side surface of the hunting blind. In that the hunter in a layout hunting blind is either sitting or lying on his back, exiting the layout hunting blind can be more difficult and often requires the hunter to use the sides of the hunting blind to push upwardly out of the hunting blind to exit the blind. This has been found to damage the weak frame configurations of prior art hunting blinds and can often damage them to the point of being inoperable.

While steps have been taken to increase the strength and rigidity of the frames associated with prior art layout hunting blinds, these have resulted in frame structures that are very difficult to assemble in the field and often must be assembled without any gloves on the hunter's hands. As is known in this art, hunters often hunt in adverse weather conditions and in remote locations such that heavy outer clothing and gloves are needed to protect the hunter from the elements. Yet further, metal frame structures utilized in prior art frame designs are at atmospheric temperatures by the time they are deployed in the field. As a result, it is much more difficult to assemble these prior art frame designs in the field in that the hunter's cold hands working with cold metal products can make it difficult to properly secure the inner engaging means used in these prior art designs. In this respect, prior art designs utilize many spring-loaded ball-style locks for the majority of the base from structure wherein the first portion of the mating arrangement includes a tubular structure (or some structure similar thereto) which has a hole in one of its sides and a spring-loaded ball protruding from that opening. The mating structural components include a similar tubular structural configuration which is larger in diameter than the first structural component wherein it is capable of telescoping onto the first mating component. The second component further includes a hole in its tubular wall shaped to receive the spring-loaded ball of the mating component. When the second component is slid onto the first component, the hunter must use one of his fingers to push the ball into the first member while sliding the second member over the ball. As can be appreciated, this can create a pinch point which is worsened by cold weather conditions. Once the second member is slid over the ball of the first member, the hunter must then align the second member over the first member to try to find the hidden ball and allow the hidden ball to pop through the opening in the wall of the second member. In that we are talking about a ball-style locking system that includes balls having a diameter of approximately a quarter inch, this assembly configuration can be difficult to assemble in any environment let alone cold environments. Yet further, in that the ball used in the locking arrangements, and the corresponding holes, are so small, they can be difficult to align and this is made more difficult by the fact that the locking ball is hidden within the second member when alignments are attempted.

As a result, while the lay-out style hunting blind has been found to be very effective in the field, prior art designs have been less effective in their structural configuration and in their ability to be assembled in the field. Yet further, prior art designs have also been found to be difficult to transport into the field in that the frame structures, while inferior in strength, are larger than needed to achieve the needed covering for a hunter in the field.

INCORPORATION BY REFERENCE

Many of these inferiorities found in the prior art are shown in several prior art patents which are all incorporated by reference into this application for what they show. The patent to Zibble, et al. U.S. Pat. No. 4,751,936, discloses a portable field blind that is a layout-style blind wherein the opening flips lengthways relative to the length of the layout blind and which includes a complicated frame structure. Latshaw U.S. Pat. No. 5,647,159 discloses a portable hunting blind with a slidable opening top. As with the Zibble patent, Latshaw discloses a complicated frame structure and a complicated lid sliding structure. Rex, et al., U.S. Pat. No. 5,887,539 discloses a boat-mounted. Ransom U.S. Pat. No. 6,694,995 discloses a layout hunting blind utilizing a looped frame structure to deploy the hunting blind in the field. Latschaw U.S. Pat. No. 6,698,131 discloses a collapsible layout hunting blind that includes a frame structure discussed above that utilizes structural characteristics that are difficult to deploy in the field and which are structurally inadequate. Devries U.S. Pat. No. 7,237,283 discloses a layout-style hunting blind that has a minimal frame configuration. Bean U.S. Pat. No. 7,549,434 discloses a portable hunting blind that utilizes a complicated frame structure as is discussed above in the background of the invention. All of these patents are hereby incorporated by reference into this application as background material.

SUMMARY OF THE INVENTION

The invention of this application relates to a hunting blind and, more particularly, to a structural configuration found to be very effective for a layout-style hunting blind. Yet further, it has been found that the frame configuration of the invention of this application is also effective in creating both one-man layout blinds and two-man layout blinds. However, while applicant believes that the one-man and two-man styles are the preferred configurations for the hunting blinds of this application; this application should not be limited to one-man and two-man hunting blinds.

More particularly, the hunting blind of the invention of this application utilizes a frame structure that includes a combination of sliding thumb-style latches and locking retention sleeve arrangements to both increase the strength of the frame structure while not adding to the weight of the structure. Yet further, this combination of structural elements also creates a frame structure that is easy to deploy in the field even in cold weather environments.

According to one aspect of the invention of this application, provided is a frame structure that includes pivotable frame sections that are secured relative to one another by a combination of thumb latches and locking retention sleeve arrangements.

According to another aspect of the invention of this application, provided is a frame structure that floats within the outer fabric layer and which does not require the outer fabric layer for structural integrity.

According to even yet a further aspect of the present invention, provided is a frame structure that includes a plurality of pivotable frame sections that are all secured relative to one another by a combination of retention sleeves, sliding positioning sleeves, and thumb-style latches. By including a frame structure, at least the base frame structure, with these structural and locking arrangements utilized to assemble the layout blind, a structurally sound frame configuration can be achieved that is both lightweight and easy to assemble in the field.

According to a further aspect of the invention of this application, provided is a frame structure that includes a central frame structure in the two-man blind that is joined to the outer frame structures. Prior art devices only include an outer frame structure and utilize only fabric to separate the two compartments of the two-man layout blind. As was referenced above, the frame structures are often utilized by the hunter to exit the hunting blind especially in that they are exiting from a lying and/or sitting position. These inner fabric structures utilized to separate the multiple compartments in a two-man blind have been found to be inadequate for this and often fail from this.

According to yet another aspect of the invention, the central frame component is a fixed central frame component wherein the outer frame components pivot relative to the central frame component. This has been found to further increase the structure of the overall layout blind without adversely increasing the weight of the hunting blind, the size of the folded blind and/or the complexity of the assembly of the hunting blind in the field.

According to yet further aspects of the present invention, provided are one or more viewable openings on the head end of the hunting blind. According to other aspects of the invention of this application, the viewable opening can be an adjustable opening and can have a mesh covering thereover to allow the hunter to see outside of the hunting blind without allowing the prey to see the hunter. Yet further, the viewable opening can include a formable and fixable configuration wherein the hunter can make easy adjustments to the viewable opening and these adjustments will be retained until readjusted.

According to yet another aspect of the invention of this application, provided is floating back and head support that allows the hunter to comfortably lay within the hunting blind for a long period of time. According to one set of embodiments, the floating back and head supports can be a fabric layer secured relative to frame components to allow it to float therebetween.

According to yet another aspect of the invention of this application, the layout blind can be formed by a combination of waterproof materials and non-waterproof materials. In this respect, the bottom of the hunting blind can be produced by a waterproof material while the top of the hunting blind is not. This can be utilized to both reduce weight and cost while providing good waterproof protection for use in the field. Yet further, it can be utilized to reduce heat buildup within the hunting blind for use over extended periods of time. Yet further, the blind can include a skirt 68 to cover the water proof layer to allow a full camouflage appearance while not reducing the water proof characteristics of the blind.

According to even yet a further aspect of the present invention, the hunting blind[s] of this application can include a foot bag that extends from the "rear" end of the frame structure wherein the hunter's legs and feet would extend beyond the forward most extent of the hunting blind frame. The term "rear" or "rear end" of the frame structure refers to the end opposite of the head end of the frame and which is located near where the rear or bottom of the hunter would be positioned in the hunter blind when the hunter is in the layout hunting position. According to another aspect of this embodiment, the foot bag can be selectively openable wherein it can be closed when used in the field to prevent moisture from entering the interior of the hunting blind and can be opened after the hunt to allow the foot bag to be easily cleaned out by the hunter.

Yet further, the invention of this application can include a wide range of other features including a flag pouch for hunting flag storage and a flag opening to allow the hunter to deploy the flag from within the hunting blind. As can be appreciated, both the flag pouch and the flag opening can be on either side of the hunting blind.

According to yet further aspects of the invention of this application, the hunting blind can be either a single man blind or a two-man blind incorporating one or more of the aspects referenced above, along with other aspects, without detracting from the invention of this application.

These and other aspects, objects, features and advantages of the invention will become more apparent to those skilled in the art upon the reading of the description of the invention set forth below taken together with the drawings and pictures which will be described in the next section.

BRIEF DESCRIPTION OF THE DRAWINGS

The invention may take physical form in certain parts and arrangements of parts, a preferred embodiment or embodiments which will be described in detail and illustrated in the accompany drawings and attachments which form a part hereof and wherein.

DESCRIPTION OF PREFERRED EMBODIMENTS

With reference to figures, shown are several embodiments of both a two-man layout hunting blind 10 and a one-man layout hunting blind 510. As discussed above, while one-man and two-man layout configurations are preferred, the invention of this application has broader application wherein it should not be limited to the embodiments shown.

Figure 1:
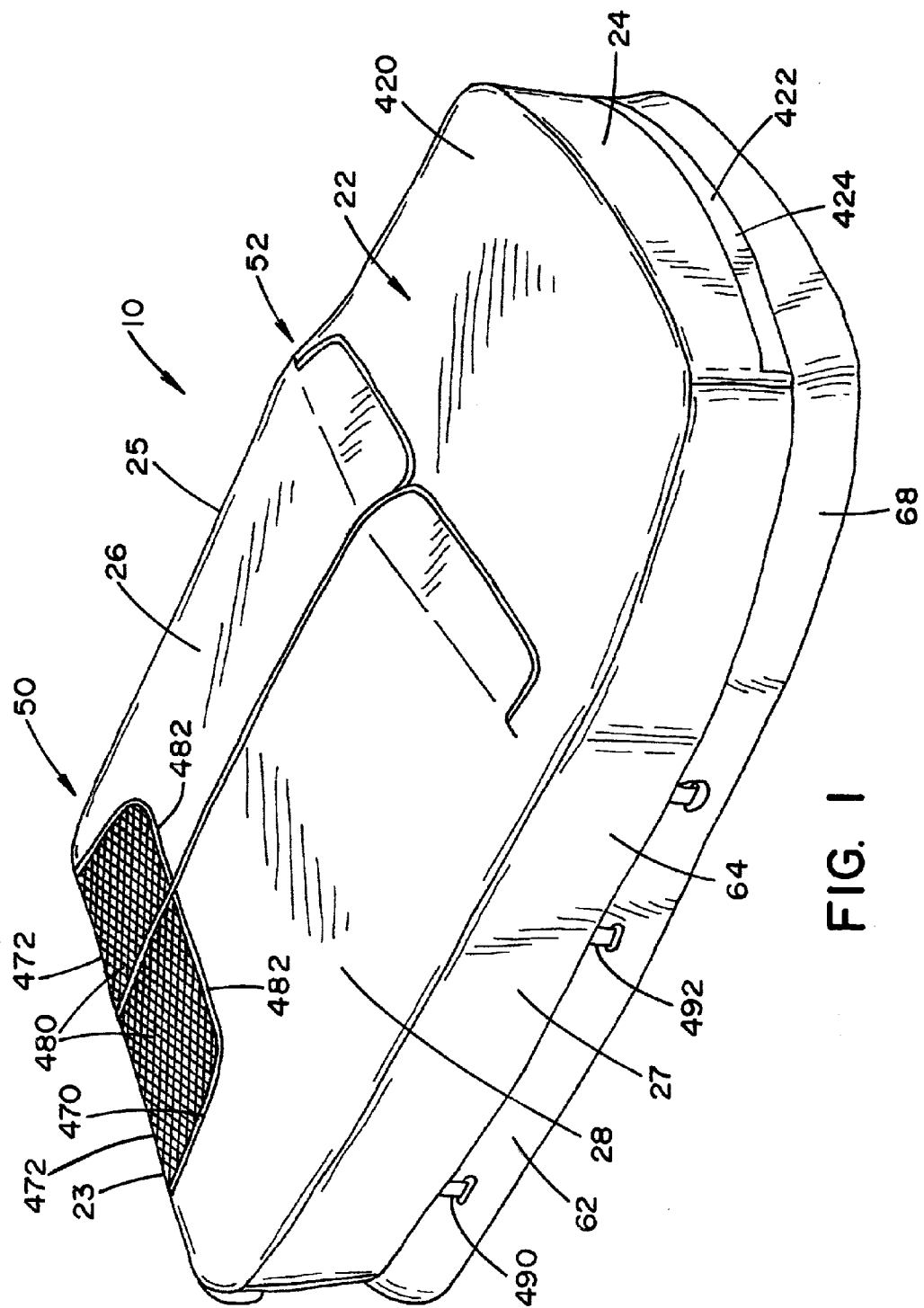
FIG. 1 is a perspective view of a two man layout blind in accordance with the present invention with the doors in a closed position.
Figure 2:
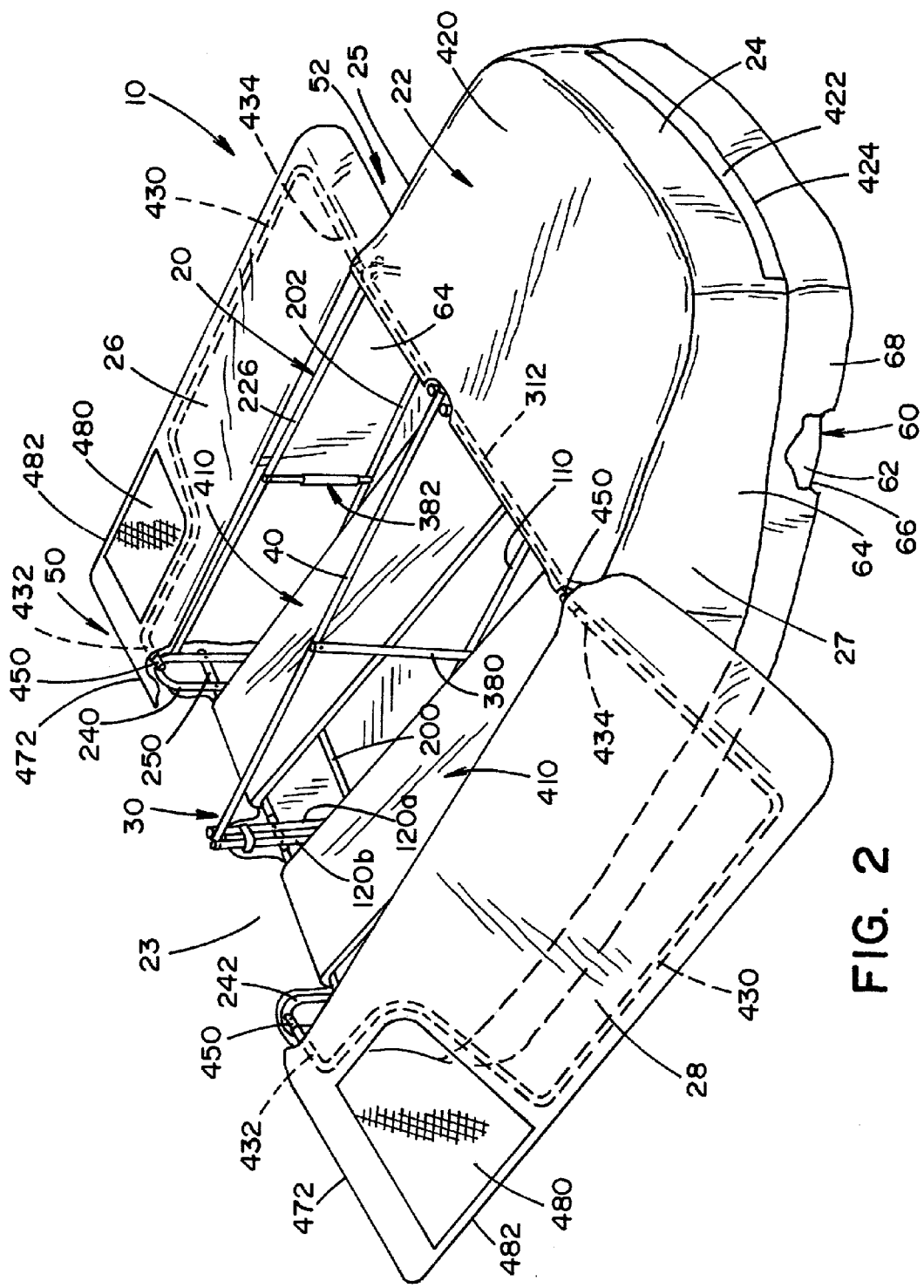
FIG. 2 is a perspective view of the two man layout blind shown in FIG. 1 with the doors in an opened position.
Figure 3:
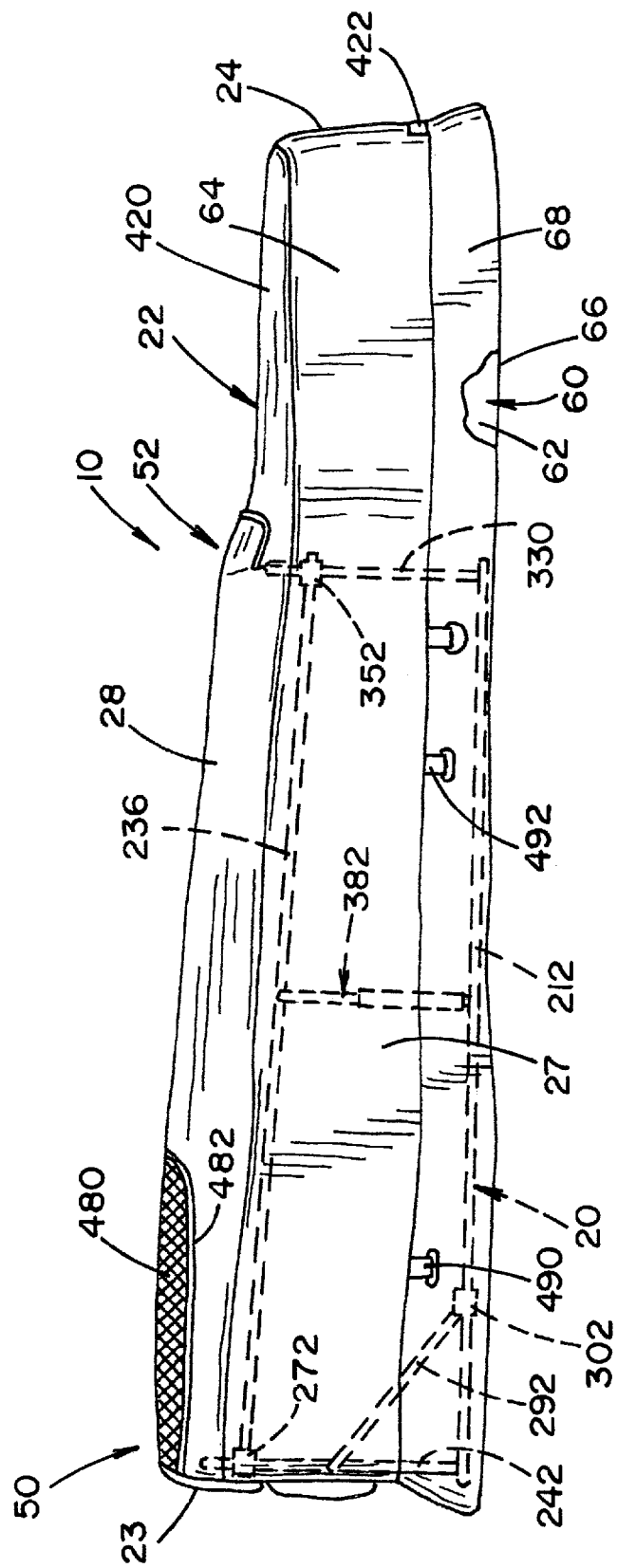
FIG. 3 is a right side elevational view of the two man layout blind shown in FIG. 1.
Figure 4:
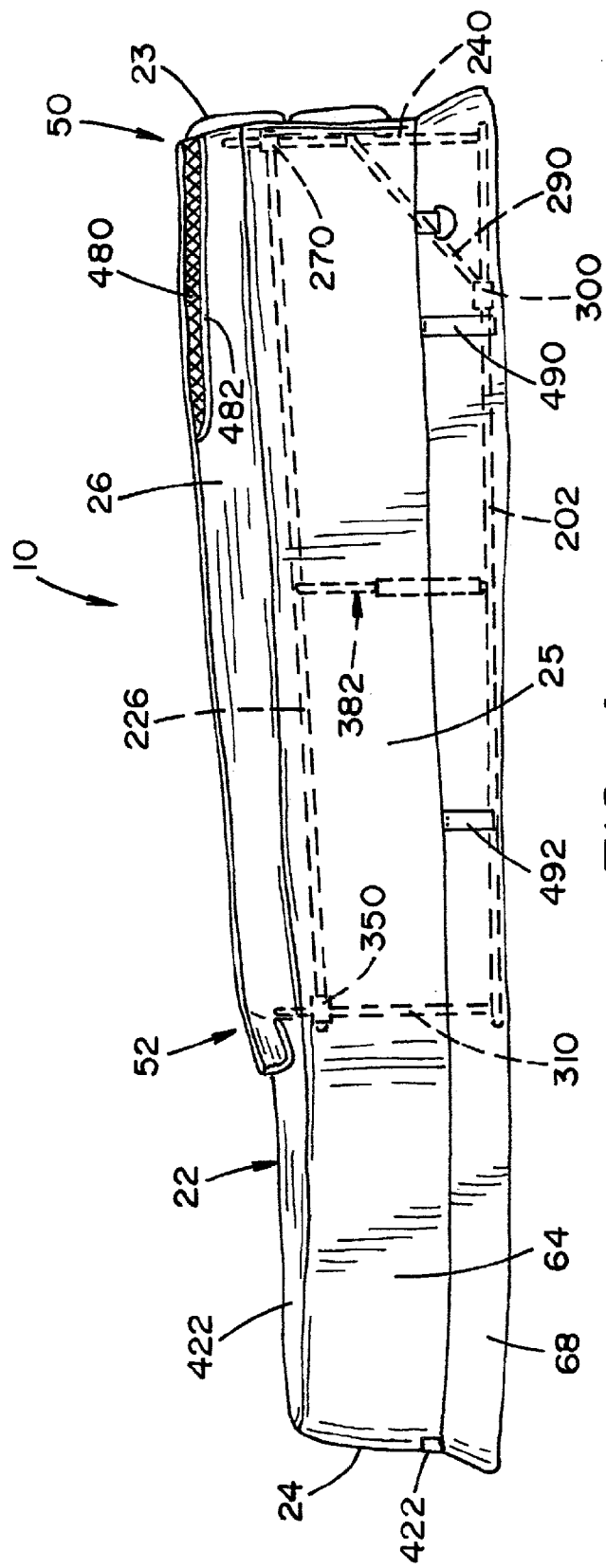
FIG. 4 is a left side elevational view of the two man layout blind shown in FIG. 1
Figure 5:
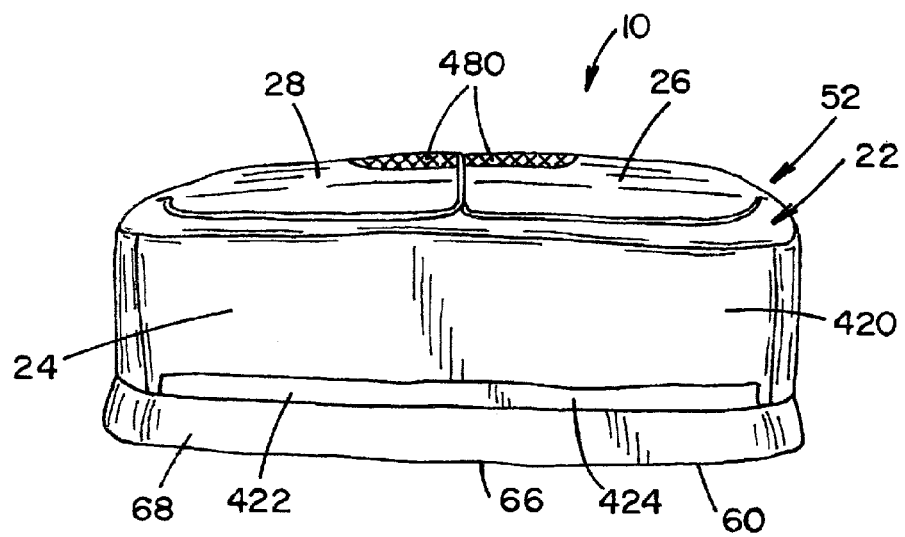
FIG. 5 is a front elevational view of the two man layout blind shown in FIG. 1.
Figure 6:
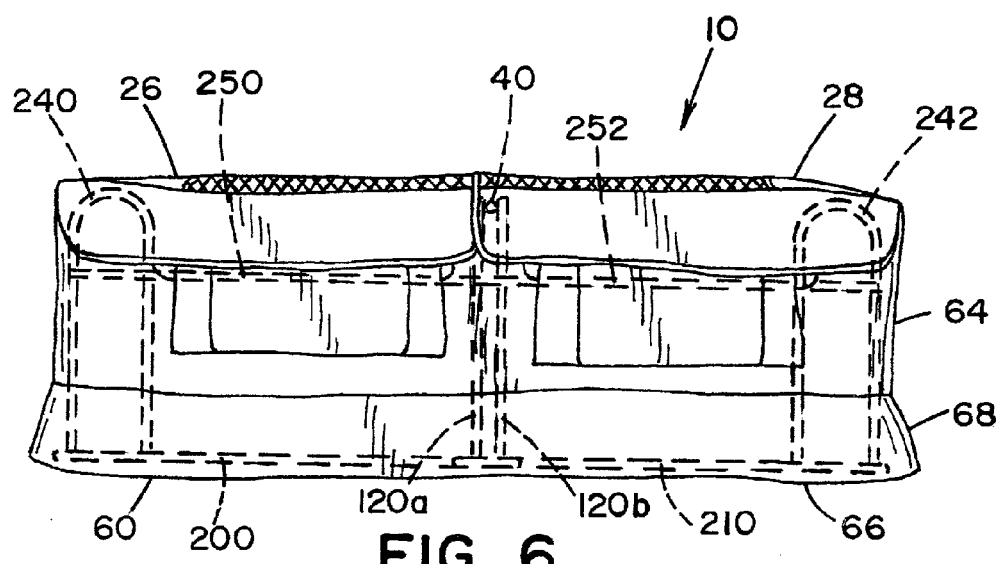
FIG. 6 is a rear elevational view of the two man layout blind shown in FIG. 1.
Figure 7:
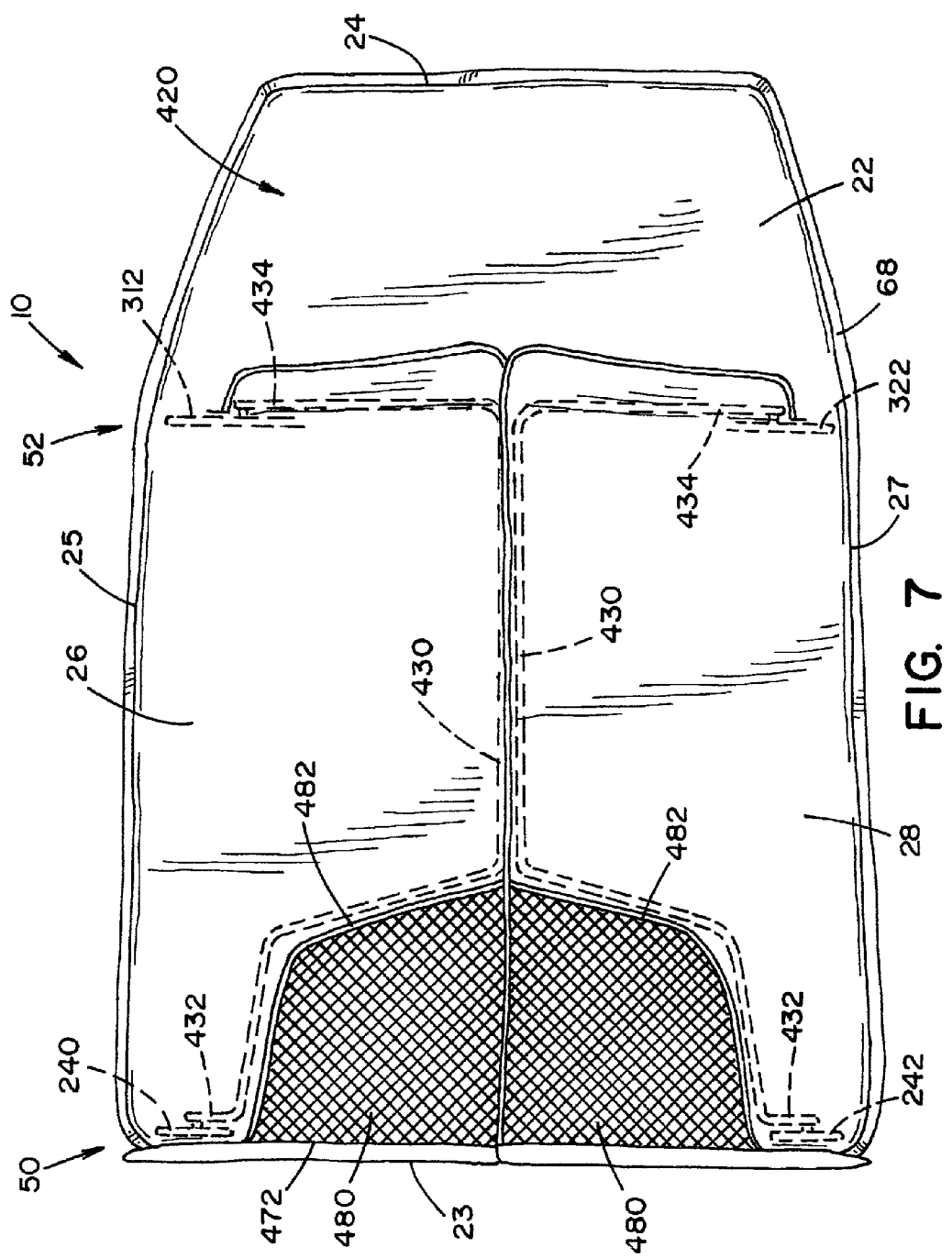
FIG. 7 is a top view of the two man layout blind shown in FIG. 1.
Figure 8:
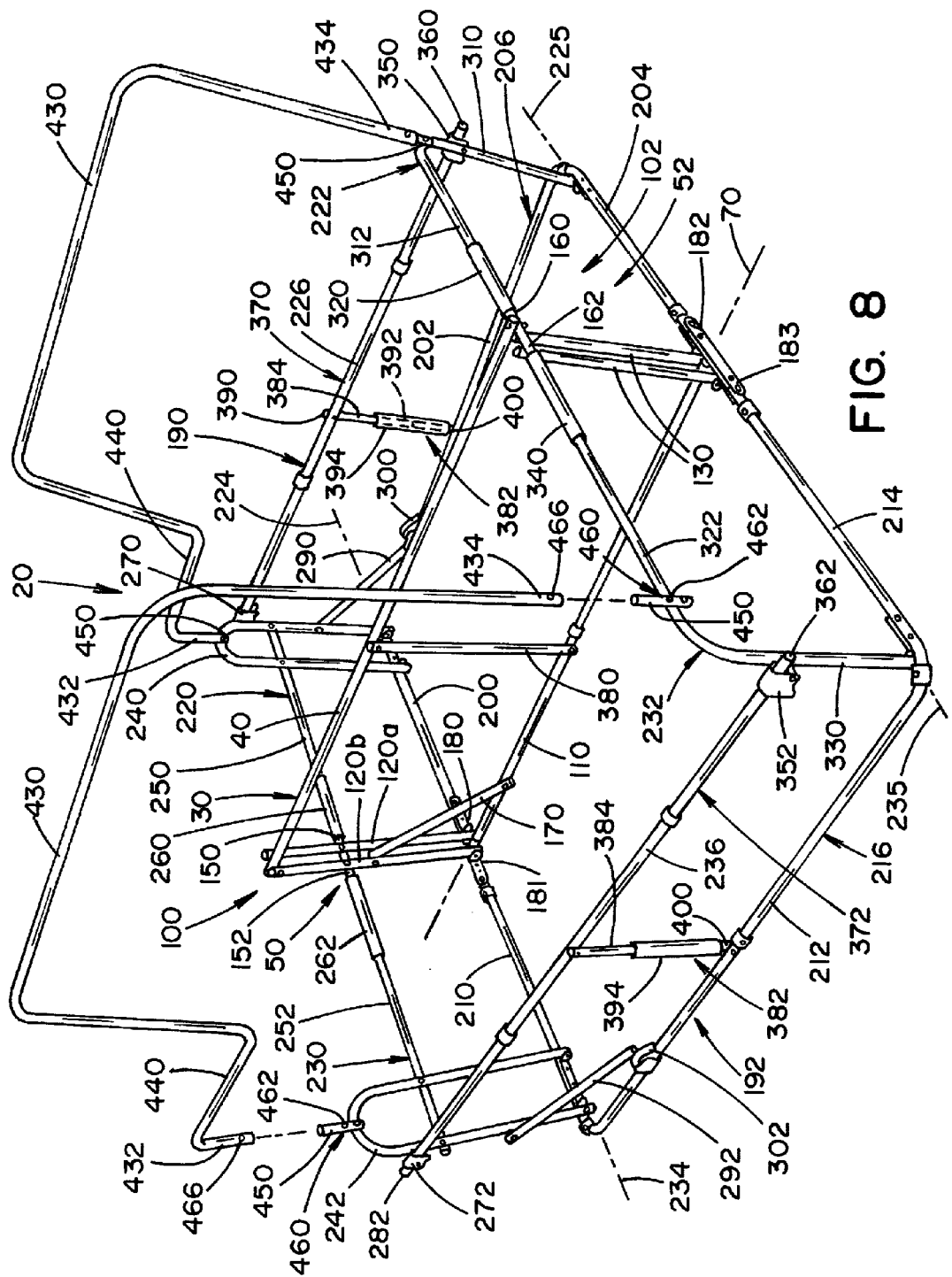
FIG. 8 is a top, front side perspective view, partially exploded, of an inner frame of the layout blind shown in FIG. 1 in an unfolded or deployed condition.
Figure 9:
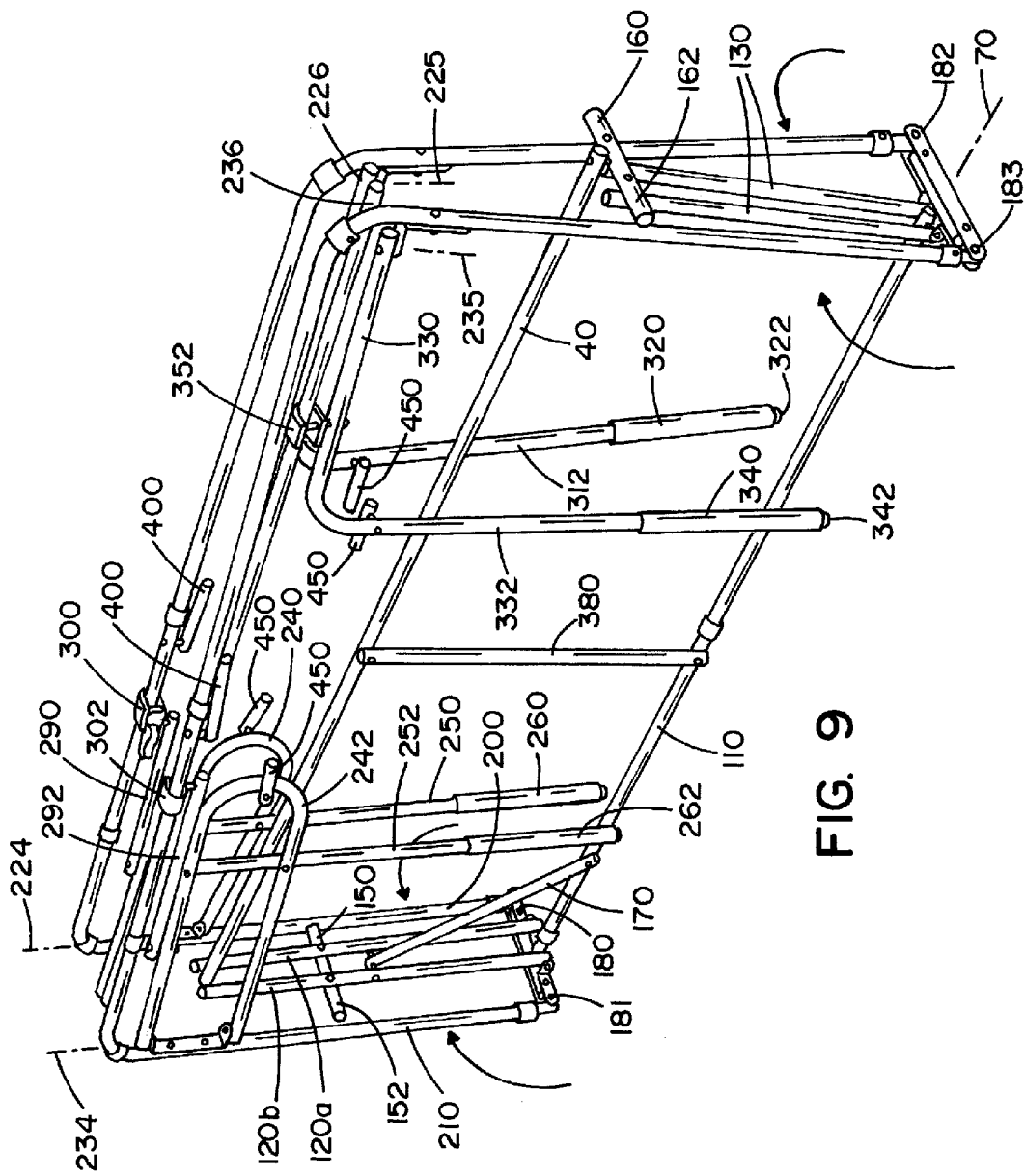
FIG. 9 is a top, front side perspective view of the inner frame shown in FIG. 8 shown in a fully folded or transportable condition.
Figure 10:
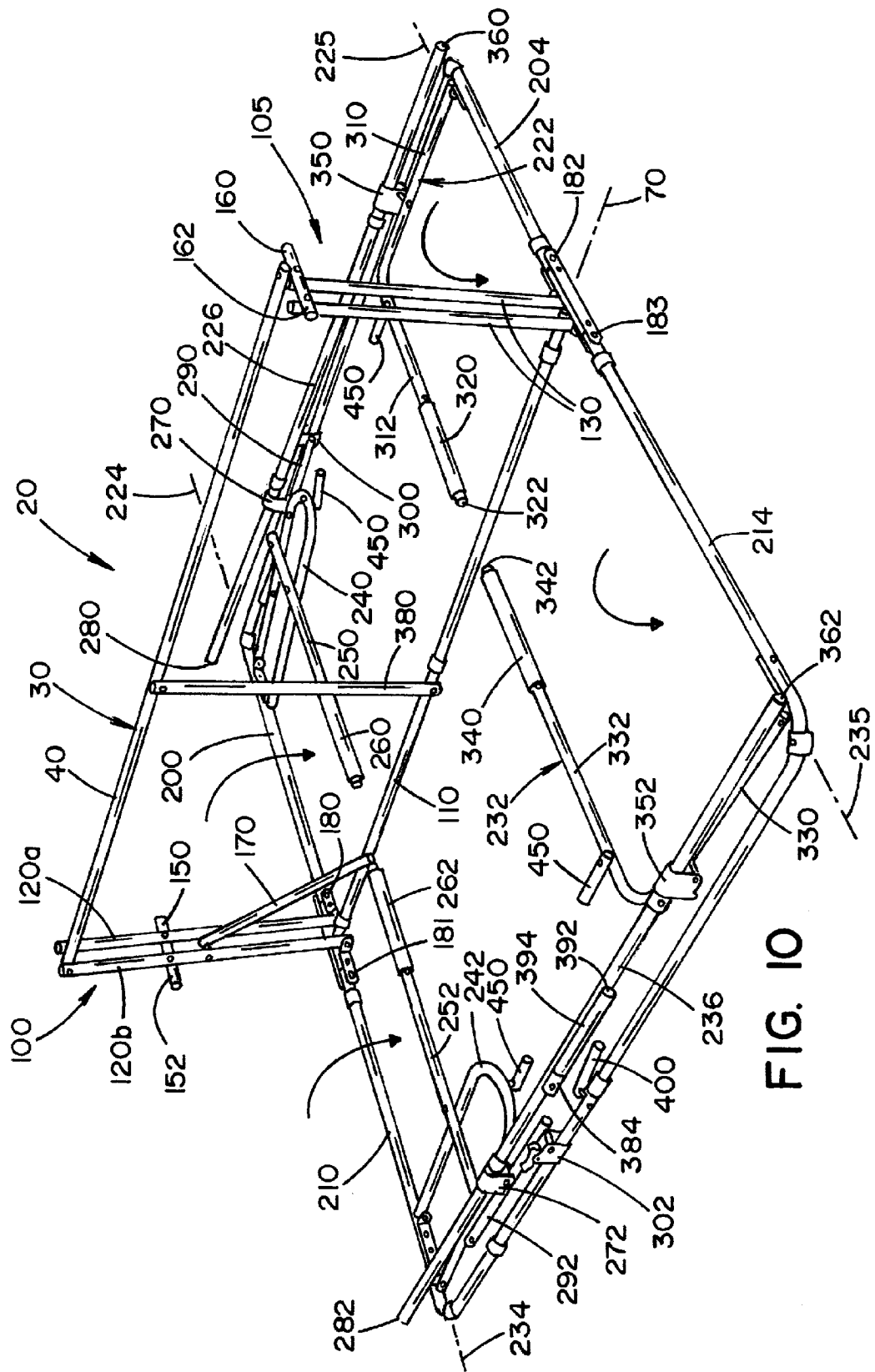
FIG. 10 is a top, front side perspective view of the inner frame shown in FIG. 8 shown in a partially unfolded condition.
Figure 11:
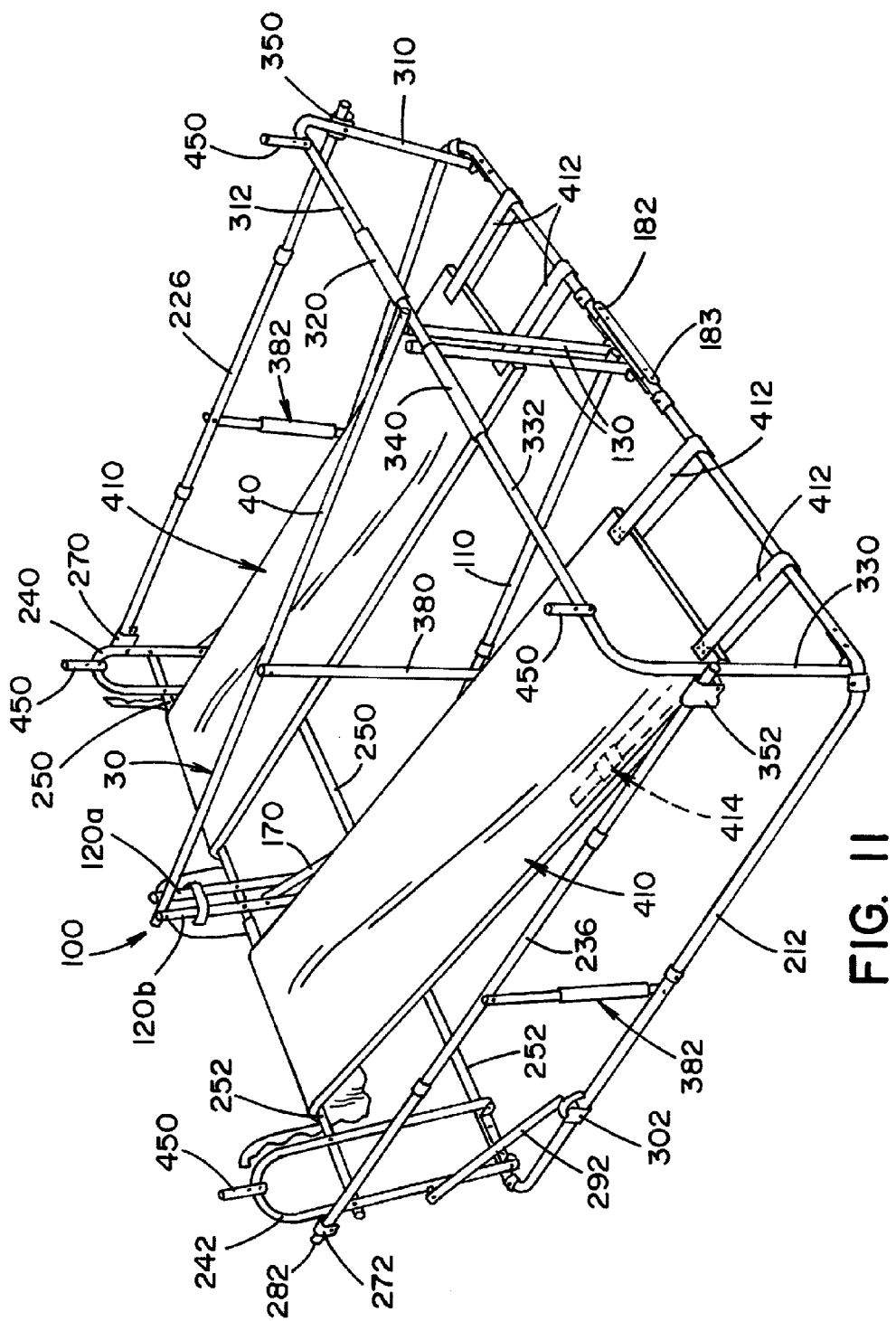
FIG. 11 is a top, front side perspective view, of the inner frame shown in FIG. 8 that includes the seat arrangements in place.
Figure 23:
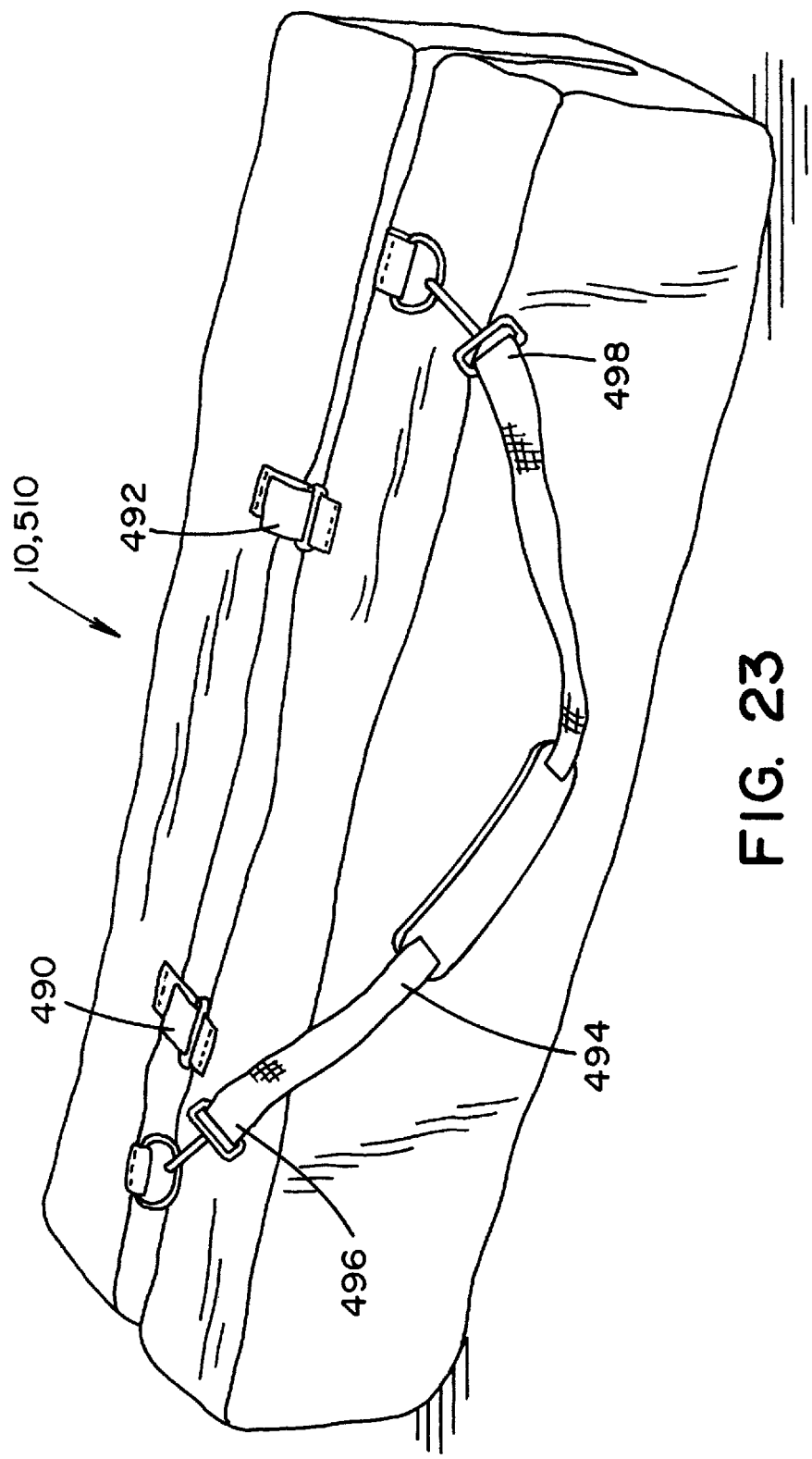
FIG. 23 is a top perspective view of a hunting blind according to certain aspects of this invention shown in the transportable condition.

With reference to FIGS. 1-11 and 23, shown is two-man layout blind 10 having an inner frame structure 20, an outer cover 22, and doors 26 and 28 pivotably connected to the inner frame structure.

Outer cover 22 of layout blind 10 and 510 can utilize any surface configurations known in the art, including camouflage patterns and those discussed above. However, this application is not to be limited to a particular camouflage pattern and could be utilized with a wide-range of camouflages, prints and colors. As is known in the art, camouflage and/or prints can change based on a wide-range of factors, including seasonal changes and specialized camouflages relating to a particular geographic region. Cover 22 extends from a head end or extent 23 to a foot extent 24 and between a left side extent 25 and a right side extent 27.

Two-man hunting blind 10 is a two-door arrangement wherein each compartment has its own door structure and the doors open outwardly from a central frame structure 30, which will be discussed in greater detail below. As discussed above with respect to the prior art, one aspect of the invention of this application is an improvement relating to the structure separating the doors wherein the invention includes central frame structure 30 supporting an upper central tube 40. The upper central tube extends from a headboard region or end 50 to a rear region or end 52 of the frame structure. By including central frame 30, the two-man hunting blind allows the hunter to exit the blind more easily. In this respect, and as can be appreciated, in a layout style hunting blind, the hunter is in a laying position when within the blind. Therefore, when exiting, the hunter must move from a laying position to a standing position to exit the blind. It has been found, that hunters typically try to push upwardly from the blind to move from the laying or sitting position to a standing position. By including central frame structure 30 with upper tube 40, the hunter can push from both the outer frame structure and the central frame structure to move from a laying or sitting position to a standing position. Prior art two-man layout hunting blinds utilized fabric to separate the two compartments wherein the hunter would either damage the hunting blind or be forced to rely solely on the outer frame structure to exit the hunting blind. The central frame structure, which will be discussed more below, also increases the rigidity of the overall frame without significantly impacting the size and/or weight of the blind in the folded or transportable condition.

Outer cover 22 of the invention of this application can include a wide range of features including, but not limited to, any features known in the art. One aspect of the invention of this application is the inclusion of a waterproof bottom layer 60 that is specifically designed to be rugged and prevent the egress of water into the blind. As is known in this field, hunting blinds are often deployed in wet environments wherein it has been found that there is a need to prevent this water from entering the blind; especially since the hunter is laying in the blind and often lays in the blind for long periods of time. Further, waterproof layer can include waterproof side extensions 62 that extend up sides 64 of cover 22 wherein the layout blinds of this application can have a waterproof layer that is several inches above a bottom surface 66 of the blind. This is especially helpful in areas that have ponded ground water, which can often be formed by the weight of hunting blind, the weight of the hunter within the hunting blind and/or the foot traffic associated with setting up the blind. In that it is preferred that this water proof material be specifically designed for its moisture barrier qualities, another feature of the blinds of this application is a downwardly extending skirt 68 extending about the base of the sides of the blind to at least partially cover the water proof material, which is shown extending about the blinds of this application. Upper portions of the cover can include the use of materials that breathe and/or openings to prevent the hunters from getting too hot.

Inner frame 20 along with the arrangement of cover 22 are configured to allow hunting blinds 10 and 510 of this application to be folded into a compact folded or transportable condition or configuration to allow the hunter to transport the hunting blind into and out of the field. When in this form, the hunting blind is folded about a central frame axis 70 that is general parallel to hunting direction wherein the hunting direction is defined by the alignment of the hunters when they are laying in the hunting blind. With the two-man hunting blind, the central axis is generally between the two hunter positions and located in the plane defined by the central frame structure 30. For the one-man hunting blind, it is generally in the middle of the single hunting position.

In greater detail, central frame 30 extends from a head end 100 in headboard region 50 to a rear end 102 at rear region 52. Central frame includes upper central tube 40 and can further include a lower central tube 110. However, while throughout this application many of the frame components are described as tubes, these components do not need to be tubular in configuration. It has just been found that tubular components provide the necessary rigidity while being light in weight. Therefore, the invention of this application is being described as "tubes," but is not to be limited to tubular structures. Central frame further include upwardly extending head-side tube or tubes 120 that generally join the upper and lower central tubes. The central frame further includes upwardly extending rear-side tube or tubes 130 wherein the upwardly extending tubes and the upper and lower central tubes form a rigid central frame structure. These upwardly extending tubes can be a single tube structure, but is preferred to be a pair of tubes as is shown in the drawings. Central frame 30 further includes transversely mounted head-side sleeve receivers 150 and 152 along with transversely mounted rear-side sleeve receivers 160 and 162 that will be discussed in greater detail below. These receivers are generally horizontally extending and each set extends oppositely to one another. The head side and/or the rear side of the central frame can further include angled corner supports. As is shown, head side includes an angled corner support 170 extending between vertical tubes 120a and 120b and lower central tube 110 to further increase the rigidity of the central frame structure.

Central frame structure 30 further includes lower pivot joints 180-183. As is shown in the drawings, these can be spaced on either side of the upwardly extending tubes and thus space on either side of the central axis wherein they generally pivot about the central axis into the transportable condition shown. Whether the frame rotates exactly or generally about the central axis does not detract from the invention of this application. In greater detail, central frame structure 30 includes head side lower pivot joints 180 and 181 and rear side lower pivot joints 182 and 183 wherein these pivot joints are to join a first outer frame structure 190 and a second outer frame structure 192. In this respect, joints 180 and 182 pivotably join first outer frame structure 190 to one side of central frame 30 and pivot joints 181 and 183 join second outer frame structure to central frame. As a result, both the first and second outer frame structures can be folded relative to the central frame structure to fold the hunting blind into the folded or transportable condition or configuration, which will be discussed more below. Further, as is shown in the drawings, the pivot joints can be spaced from one another based on the thickness of the central frame structure wherein outer frame structures 190 and 192 can fold flat against central frame structure 30.

It should be noted, that throughout this application applicant uses "first" and "second" in relations to structure in this application and the corresponding figures, but this is being done only to simplify the description and should not be used to limit this application. Thus, while "first" and "second" may be described in, for example, relationship to certain sides (front, back, left and/or right), this terminology in the description and the claims are not to be limited in this way. Accordingly, for example, the first outer frame structure can be either the right or the left frame structure and the same is true for the second outer frame structure.

Turning to the outer frame structures, these structures are configured to both pivot relative to the central frame structures and to include head and rear pivot assemblies to allow the outer frame structures to fold flat and to deploy such that they form an upper frame structure. Again, this can be pivots that are "generally" about the central axis to allow the outer frame structures to fold flatly against the central frame structure when a central frame structure is included in the blind. Yet further, the same is true for the one man blind to better promote a flat folding about the central axis. More particularly, first outer frame structure 190 includes a first lower head tube 200, a first lower side tube 202 and a first lower rear tube 204 thereby forming a first U-shaped lower tube assembly 206. Assembly 206 can be a single tube formed into the U-shape or can be an assembly of components forming the U-shape. Similarly, second outer frame structure 192 includes a second lower head tube 210, a second lower side tube 212 and a second lower rear tube 214 thereby forming a second U-shaped lower tube assembly 216. Again, this tube assembly can be a single tube formed into the U-shape or can be an assembly of components forming the U-shape. First outer frame structure 190 is pivotably connected to joints 180 and 182 to allowed for the pivotable connection discussed above. Similarly, second outer frame structure 192 is pivotably connected to joints 181 and 183 to allowed for the pivotable connection discussed above.

More particularly, first outer frame structure 190 is pivotably connected to central frame 30 by first lower head tube 200 being pivotably joined to central frame 30 by way of head-side lower pivot 180 and first lower rear tube 204 being pivotably joined to central frame 30 by way of rear-side lower pivot 182 wherein U-shaped lower tube structure assembly 206 pivots relative to central frame 30 between the transportable condition and a deployed condition. Similarly, second outer frame structure 192 is pivotably connected to central frame 30 by second lower head tube 210 being pivotably joined to central frame 30 by way of head-side lower pivot 181 and second lower rear tube 214 being pivotably joined to central frame 30 by way of rear-side lower pivot 183 wherein U-shaped lower tube structure assembly 216 also pivots relative to central frame 30 between the transportable condition and a deployed condition. These structures form a rigid central structure along with a rigid based structure for the hunting blind. It has been found that this is a solid foundation for the hunting blind that can be folded quickly in the field without any tools, clips, clamps or fasteners.

Outer frame structures 190 and 192 further include upper assemblies, which create the upper portions of the hunting blind that pivot relative to these structures and pivot separate from the central frame structure. In this respect, first outer frame structure 190 includes a first head side pivotable frame structure 220 and a first rear pivotable frame structure 222. First head side pivotable frame structure 220 being pivotable about a first head axis 224 that is transverse to central frame axis 70. First rear pivotable frame structure 222 being pivotable about a first rear axis 225 that is also transverse to central frame axis 70. Both pivot relative to first U-shaped lower tube assembly 206. In addition, first head side structure 220 and first rear structure 222 join and support a first upper side tube 226 that will be discussed more below. Similarly, second outer frame structure 192 includes a second head side pivotable frame structure 230 and a second rear pivotable frame structure 232. Second head side pivotable frame structure 230 being pivotable about a second head axis 234 that is also transverse to central frame axis 70. Second rear pivotable frame structure 232 being pivotable about a second rear axis 235 that is also transverse to central frame axis 70. Both pivot relative to second U-shaped lower tube assembly 216. In addition, second head side structure 230 and second rear structure 232 join and support a second upper side tube 236 that also will be discussed more below.

Turning to the head side pivotable frame structures 220 and 230, these are pivotable in the hunting direction from a generally upward position, which is a deployed position, to a folded condition, which is the transportable position, wherein the structures are general laying on outer frame structures 190 and 192, respectively. Head side pivotable frame structures 220 and 230 include first and second upward extension 240 and 242, respectively, that are pivotably joined to first and second lower head tubes 200 and 210, respectively. First upward extension 240 includes a first upper head tube 250 that is generally parallel to first lower head tube 200 and second upward extension 242 includes a second upper head tube 252 that is generally parallel to second lower head tube 210. First upper head tube 250 further includes a first head locking retention sleeve 260 that is shaped to interengage with transversely mounted head-side sleeve receivers 150. In this respect, the locking sleeves of this application are tubular members that slide axially along the tube in which it is connected. This axial sliding action can be used to slide the tube into engagement with a corresponding sleeve receiver that is a tube of similar diameter than the tube in which the sleeve is secured. This has been found to be an effective joining arrangement wherein a hunter can easily connect two parallel tubes and secure the tubes relative to one another even with gloves on. In order to secure the first upper head tube 250 to the central frame structure, the user merely aligns the first upper head tube 250 with transversely mounted head-side sleeve receivers 150 and then slides first head locking retention sleeve 260 over head-side sleeve receivers 150. Similarly, second upper head tube 252 further includes a second head locking retention sleeve 262 that is shaped to interengage with transversely mounted head-side sleeve receivers 152. In order to secure the second upper head tube 252 to the central frame structure, the user merely aligns the second upper head tube 252 with transversely mounted head-side sleeve receivers 152 and then slides second head locking retention sleeve 262 over head-side sleeve receivers 152.

Head side pivotable frame structures 220 and 230 further include first and second head sliding positioning sleeves 270 and 272, respectively, that join first and second upper side tube 226 and 236, respectively, relative to the head frame structures. These head sliding positioning sleeves are pivotably joined to the respective head frames such that when the head frame is pivoted, the head sliding sleeves pivot and sliding positioning sleeves slide along the upper side tubes. When the head frame is in the upper position or deployed condition, the sleeves are near head ends 280 and 282 of upper side tubes 226 and 236, respectively. As the head frames are folded into the transportable condition, sliding positioning sleeves slide along upper side tubes 226 and 236 away from head ends 280 and 282, respectively. Head side pivotable frame structures 220 and 230 can further include first and second head cross members 290 and 292, respectively. The cross member can be used to help lock the head side frame structures in upward or deployed position. More particularly, first cross member 290 can extending between first upward extension 240 and first lower side tube 202 wherein first cross member 290 can be pivotably attached to first upward extension 240 and slidingly attached to first lower side tube 202 by way of a first slide lock or thumb latch 300. First slide lock or thumb latch 300 can be selectively lockable relative to first lower side tube 202 wherein first upward extension 240 can be locked into the upward position by latch 300 after it is rotated to that position by the thumb latch. Then, when the blind is to be collapsed, the thumb latch can be unlatched thereby allowing the upward extension to pivot relative to lower tube assembly 206 as thumb latch 300 slides along side tube 202. Second cross member 292 can extending between second upward extension 242 and second lower side tube 212 wherein second cross member 292 can be pivotably attached to second upward extension 242 and slidingly attached to second lower side tube 212 by way of a second slide lock or thumb latch 302. Second slide lock or thumb latch 302 can be selectively lockable relative to second lower side tube 212 wherein second upward extension 242 can be locked into the upward position by latch 302 after it is rotated to that position by the thumb latch. Then, when the blind is to be collapsed, the latch can be unlatched thereby allowing the upward extension to pivot relative to lower tube assembly 216 as thumb latch 302 slides along side tube 212.

As with the head side frame structure, rear pivotable frame structures 222 and 232 are also pivotable in the hunting direction and towards and away from the corresponding U-shaped outer frame structures 206 and 216, receptively. In the embodiments shown, rear pivotable frame structures 222 and 232 are generally L-shaped and extend from a pivotal base near the corner of the outer frame structures 206 and 216. In greater detail, first rear pivotable frame structure 222 includes a first base leg 310 and a first distal leg 312 that together form the L-shape. As with other components of the frame of this application, these legs can be formed from tubular members and can be a single tubular member or an assembly without detracting from the invention of this application. It is preferred that this structure is formed from a single tubular member. First rear pivotable frame structure 222 further includes a first rear locking retention sleeve 320 slidingly joined to a distal end 322 of distal leg 312. First rear locking retention sleeve 320 is shaped to interengage with transversely mounted rear-side sleeve receivers 160. Again, the locking sleeves of this application are tubular members that slide axially along the tube in which it is connected. This axial sliding action can be used to slide the tube into engagement with a sleeve receiver that is a tube of similar diameter than the tube in which the sleeve is secured. This has been found to be an effective joining arrangement wherein a hunter can easily connect two parallel tubes and secure the tubes relative to one another even with gloves on. In order to secure the first distal leg 312 to the central frame structure, the user merely aligns the first distal leg 312 with transversely mounted rear-side sleeve receivers 160 and then slides first rear locking retention sleeve 320 over rear-side sleeve receivers 160. Similarly, second rear pivotable frame structure 232 includes a second base leg 330 and a second distal leg 332 that together form the L-shape. As with other components of the frame of this application, these legs can be formed from tubular members and can be a single tubular member or an assembly without detracting from the invention of this application. It is preferred that this structure is formed from a single tubular member. Second rear pivotable frame structure 232 further includes a second rear locking retention sleeve 340 slidingly joined to a second distal end 342 of second distal leg 332. Second rear locking retention sleeve 340 is shaped to interengage with transversely mounted rear-side sleeve receivers 162. In order to secure the second distal leg 332 to the central frame structure, the user merely aligns the second distal leg 332 with transversely mounted rear-side sleeve receivers 162 and then slides second rear locking retention sleeve 340 over rear-side sleeve receivers 162. As with the head side, distal legs 312 and 332 are general parallel to and upwardly spaced from first and second U-shaped lower tube assemblies 206 and 216, respectively. In particular, distal leg 312 is parallel to and upwardly spaced from first lower rear tube 204 and distal leg 332 is parallel to and upwardly spaced from second lower rear tube 214 when the blind is in the deployed condition. When the hunting blind is in the collapsed or transportable condition, base legs 310 and 330 are general parallel to and inwardly spaced from first lower side tube 202 and second lower side tube 212, respectively.

Rear side pivotable frame structures 222 and 232 further include first and second rear sliding positioning sleeves 350 and 352, respectively, that join first and second upper side tube 226 and 236, respectively, relative to the rear frame structures. These rear sliding positioning sleeves are pivotably joined to the respective base legs 310 and 330 of the rear frames such that when the rear frame is pivoted, the rear sliding sleeves pivot and the sliding positioning sleeves slide along the upper side tubes. When the rear frame is in the unfolded position or deployed condition, the sleeves are near rear ends 360 and 362 of upper side tubes 226 and 236, respectively. As the rear frames are folded into the transported condition, sliding positioning sleeves 350 and 352 slide along upper side tubes 226 and 236 away from rear ends 360 and 362, respectively. The locking cross members of the head side pivotable frame structures 220 and 230 can help lock the rear frame structure in the upward position in combination with rear locking retention sleeve 320 and 340.

As a result of this configuration, the outer frame structures can include both a U-shape lower frame assemblies 206 and 216 and U-shape upper frame assemblies 370 and 372 respectively. In the embodiments shown, first upper frame assembly 370 is formed by first upper head tube 250, first upper side tube 226 and first distal leg 312 and this assembly is joined relative to central frame by first head locking retention sleeve 260 and first rear locking retention sleeve 320. Similarly, second upper frame assembly 372 is formed by second upper head tube 252, second upper side tube 236 and second distal leg 332 and this assembly is joined relative to central frame by second head locking retention sleeve 262 and second rear locking retention sleeve 340.

Yet further, the inner frame structure or arrangement 20 can include one or more vertical support members that can provide support for upper frame members and/or help lock the frame assembly in the deployed condition. In this respect, central frame structure 30 can include one or more vertical support members 380 that can join lower central tube 110 and upper central tube 40. In that central frame structure 30 is a fixed structure, support member 380 can be a fixed vertical member that is permanently secured between tubes 110 and 40. First outer second frame structures 190 and 192 can include one or more selectively securable vertical support members 382 extending between the upper and lower tubes of the assemblies. With reference to first frame structure 190, vertical support member 382 can extend between first lower side tube 202 and first upper side tube 226. However, in that tubes 202 and 226 must move relative to one another when the frame is deployed or folded up, these members are selectively engageable. In a preferred embodiment, support members 382 are formed by a support tube 384 having a base end 390 and a distal end 392 wherein base end 390 is pivotably joined to one of tubes 202 and 226. The distal end includes a locking retention sleeve 394. The other of tubes 202 and 226 include a sleeve receiver 400 and locking retention sleeve 394 is slidable on tube 384 and shaped to engage sleeve receiver 400. Accordingly, after the frame is unfolded and set into the deployed condition, locking retention sleeve 394 can be slid into sleeve receiver 400. This arrangement can be used to provide vertical support for the upper tube and/or can be utilized to help maintain the frame structure in the deployed condition. The same vertical support member 382 can be used on assembly 192. In a preferred embodiment, support tube 384 has a length such that distal end 392 is closely spaced to sleeve receiver 400 such that distal end 392 engages sleeve receiver 400 when any weight is applied to upper side tubes 226 and 236, such as when the hunter pushes on the upper side tubes to get out of the hunting blind.

The hunting blind of this application can further include floating seat arrangements 410 that provides floating back and head support for the hunter. The seat arrangement can extend between upper head tubes 250 and 252 and lower rear tubes 204 and 214, respectively. Seat arrangement can be selectively secured to at least one of these tubes to allow the frame to be folded into the transportable condition. This can be done with any fastening systems known in the art including, but not limited to, hook and loop style fastening systems and locking straps, which have been found to provide an effective selective fastening arrangement for these seat structures. Further, floating seat arrangements 410 can help secure cover 22 relative to inner frame 20 to help maintain the alignment of the cover relative to the frame. In this respect, seat arrangements 410 can include a pair of adjustable locking straps 412 that are selectively engageable with clips 414 underneath the floating seat that wrap about lower rear tubes 204 and 214. Upper seat portion 415 of the seat arrangement can wrap about upper head tubes 250 and 252 and be joined to the outer cover a cover seat joint 416. Cover 22 can further include one or more cover straps 418 to help secure the cover to the frame. Seat straps 412 allow the seat to be adjusted as desired by the hunter to create a desired amount of support and to tighten the connection between the cover and the frame. In that this seat portion is both padded and floating, it has been found that the seat provides a comfortable and supportive seat structure for the hunter. The upper portion of the floating seat can includes a padded section that extends over the head board locking tube for head support.

Another aspect of the invention of this application is the overall size of the inner frame. In this respect, the inner frame of the blind is configured such that the frame portion of the hunting blind is primarily for the upper torso portion of the hunter and general extends to the "rear" of the hunter. Accordingly, the blind of this application further in includes a foot bag 420 extending past the rear end of the inner frame and between rear region or end 52 and foot extent 24. The foot bag extends from the frame and allows for the coverage of the hunter's legs without adversely adding to the length and weight of the overall frame. In operation, the hunter's legs would extend through or past rear pivotable frame structures 222 and 232 and toward foot extent 24. The foot bag extends from the frame and allows for the coverage of the hunter's legs without adversely adding to the length and weight of the overall frame. As a result, the frame portion can be reduced in size and still be used in connection with taller hunters. The foot bag can also include a selectively openable section 422 that allows the foot bag to be easily cleaned out after use. In one embodiment, selectively openable section 422 is formed by a zippered section and the zippered section is covered by flap 424.

The hunting blind of this application further includes one or more doors. In a preferred embodiment, the blind includes two doors 26 and 28. While a wide range of door frames can be used without detracting from the invention of this application, the doors can be formed by generally U-shape bars to provide a desired amount of rigidity. Further, the door bars can be wrapped by any fabric known in the industry and any fabric pattern known in the industry. This can include fabric that follows the fabric used for outer cover 22. With reference to door 26, the door includes a door bar 430 that extends from a first bar end 432 to a second bar end 434. While bar 430 is generally U-shaped, it can include a recessed portion 440, which will be discussed more below. Once the inner assembly is assembled into the deployed condition, door 26 can be secured relative to the frame structure and the door can add additional structure to the inner frame assembly. In greater detail, inner frame 20 includes two door mounts 450 for door 26 and these are joined relative to the frame and allow pivoting action of the door relative to the frame. In the preferred embodiment, door mounts 450 are joined relative to distal leg 312 and upward extension 240. Door mounts 450 can include a wide range of fastening arrangements to adequately secure the door bar to the inner frame. As is shown, door mounts 450 are pivotably attached to the corresponding bar and include a spring loaded ball arrangement 460 wherein ball 462 extends outwardly from the surface of the mount. First bar end 432 and second bar end 434 include holes 466 shaped to receive ball 462 of arrangement 460. In order to assemble the door, ball 462 is depressed wherein the bar ends are pushed coaxially over mounts 450 until ball 462 is aligned with hole 466 wherein ball 462 moves into the hole and lock the door bar to the mount. When the door is to be removed, ball 462 is again depressed and the door bar is pulled from mount 450. Similarly, inner frame 20 includes two door mounts 450 for door 28 and these are joined relative to the frame and allow pivoting action of the door relative to the frame. In the preferred embodiment, door mounts 450 for door 27 are joined relative to distal leg 332 and upward extension 242.

Again, the door bars of this application are not perfectly U-shaped and include recessed portions 440. These recessed portions are to allow for head side openings 470 at or near the head ends 472 of the doors. However, at least some of the remaining door frame can be sized so that it will rest on upper bar or tube 40 of central frame 30. This provides for a solid closing door arrangement that will not break down over time. Further, door mounts 450 can be positioned on an outer side of distal legs 312 and 332 so that a portion of the door frame can also rest on the distal legs. Thus, both ends of the door tubes are secured relative to the outer frame, the door can pivot relative to the outer frame and close against the central frame. Yet further, the attachment of the door tube to the base frame structure increases the structural rigidity of the overall hunting blind by helping lock the rear frame structure to the head side frame structure. Even yet further, doors 26 and 28 can include one or more viewable openings 480 and these are preferably at least near head end 472 of the doors. This opening can be formed by a meshed section near the head end that can be used by the hunter(s) to provide fresh air and/or provide for looking outwardly from the hunting blind when in use. This mesh can include an outer edge wire 482 extending there around that can be a flexible wire which allows the mesh sections to be selectively deformable as is desired by the hunter wherein the deformed sections will maintain their desired shape.

The hunting blind of this application can further include a pair of securing straps 490 and 492 utilized to maintain the hunting blind in the transportable condition. In addition, a shoulder strap 494 can be provided which has a first end 496 connected relative to first outer frame structure 190 and a second end 498 connected to second outer frame structure 192. This configuration both supports the entire frame structure and balances the hunting blind when it is lifted by the shoulder strap. The securing straps can be Velcro securing straps to selectively maintain the hunting blind in the folded or transportable condition.

Figure 12:
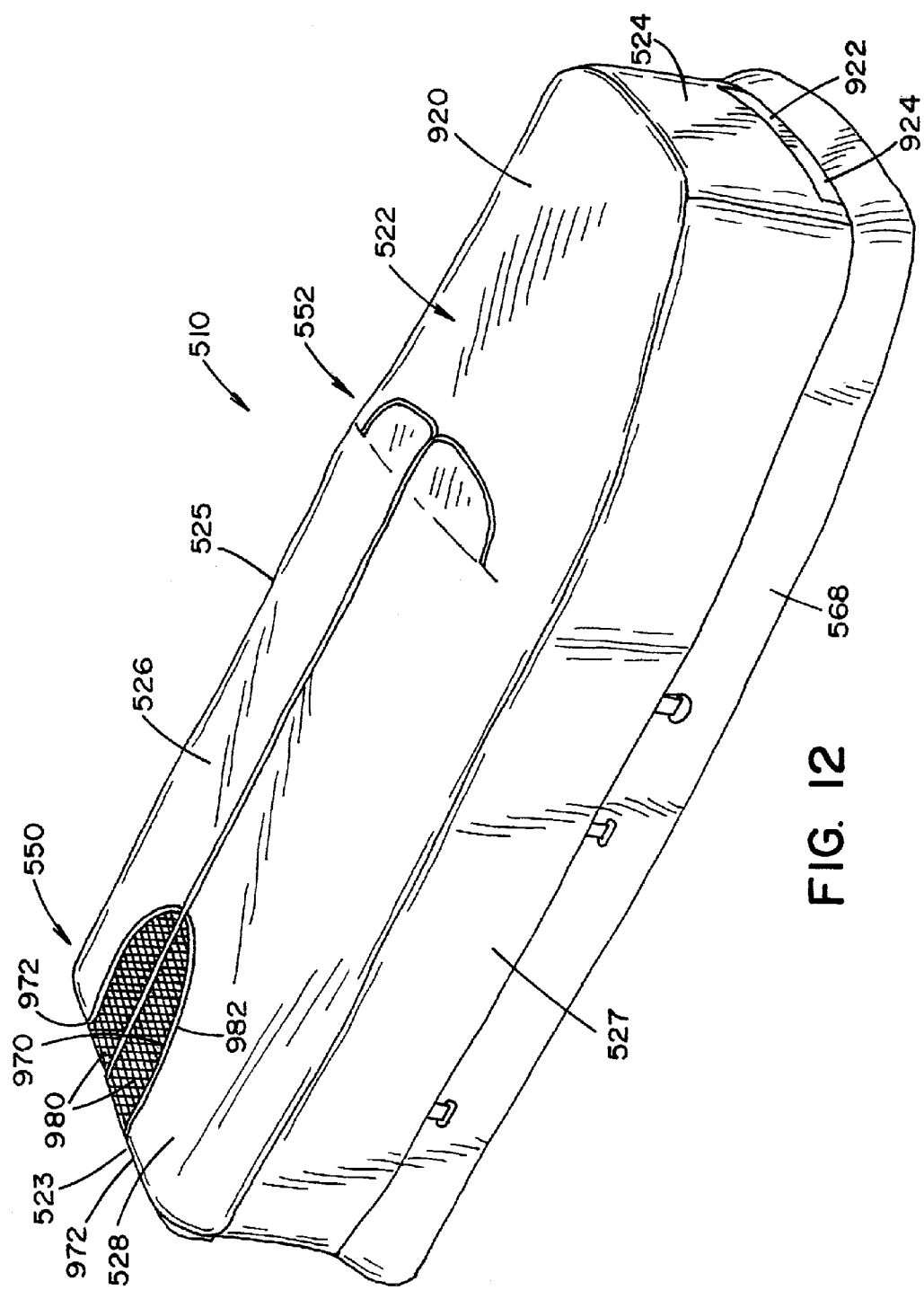
FIG. 12 is a perspective view of a one man layout blind in accordance with other aspects of the present invention with the doors in a closed position.
Figure 13:
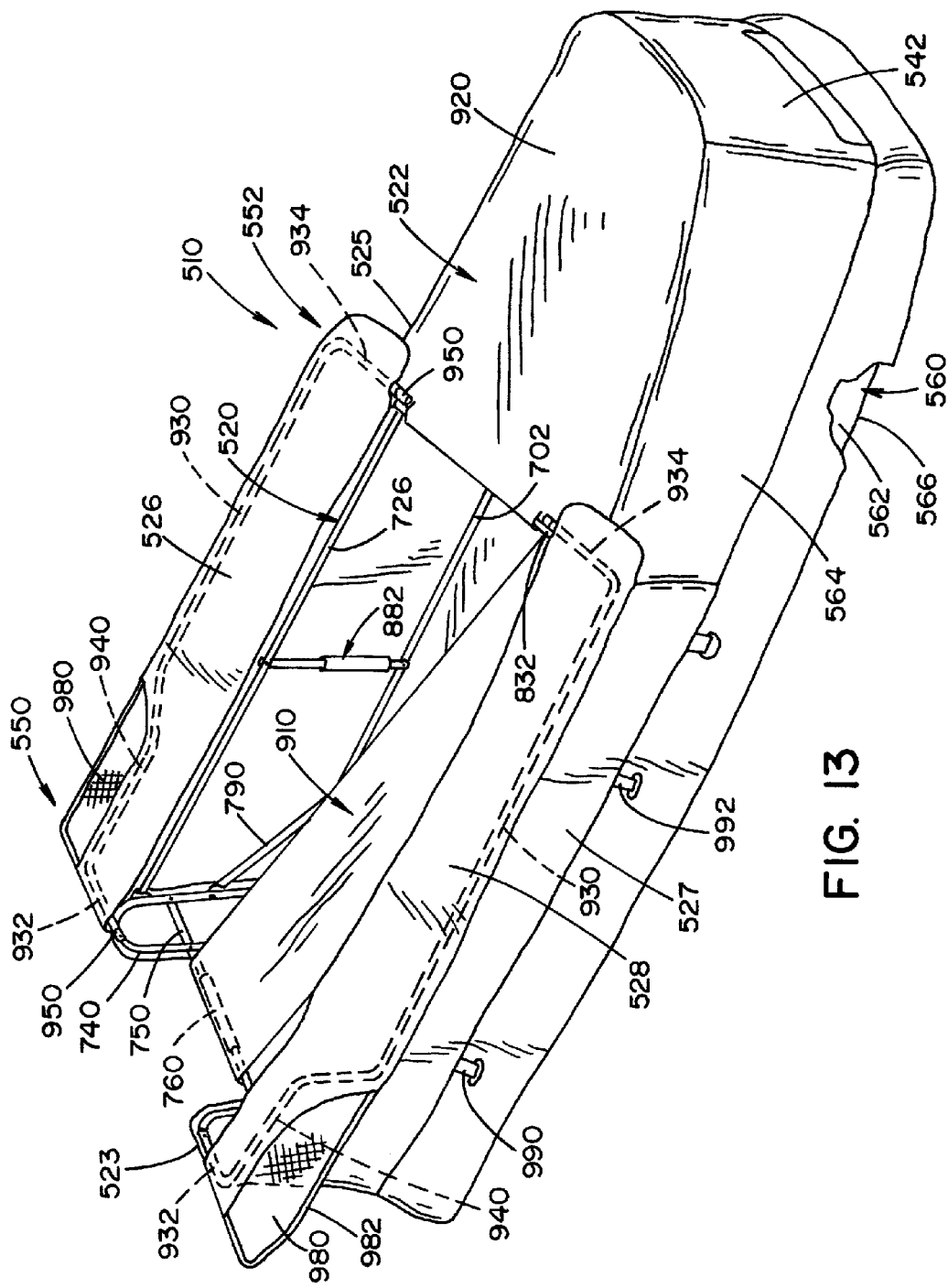
FIG. 13 is a perspective view of the one man layout blind shown in FIG. 12 with the doors in an opened position.
Figure 14:
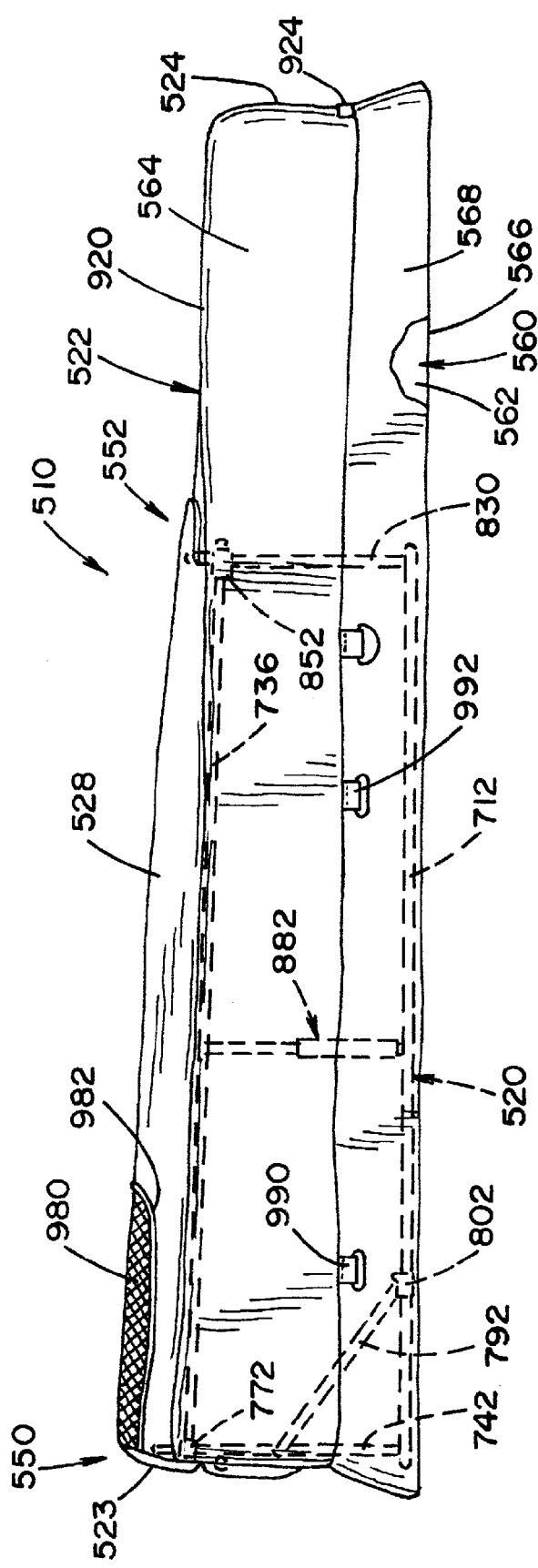
FIG. 14 is a right side elevational view of the one man layout blind shown in FIG. 12.
Figure 15:
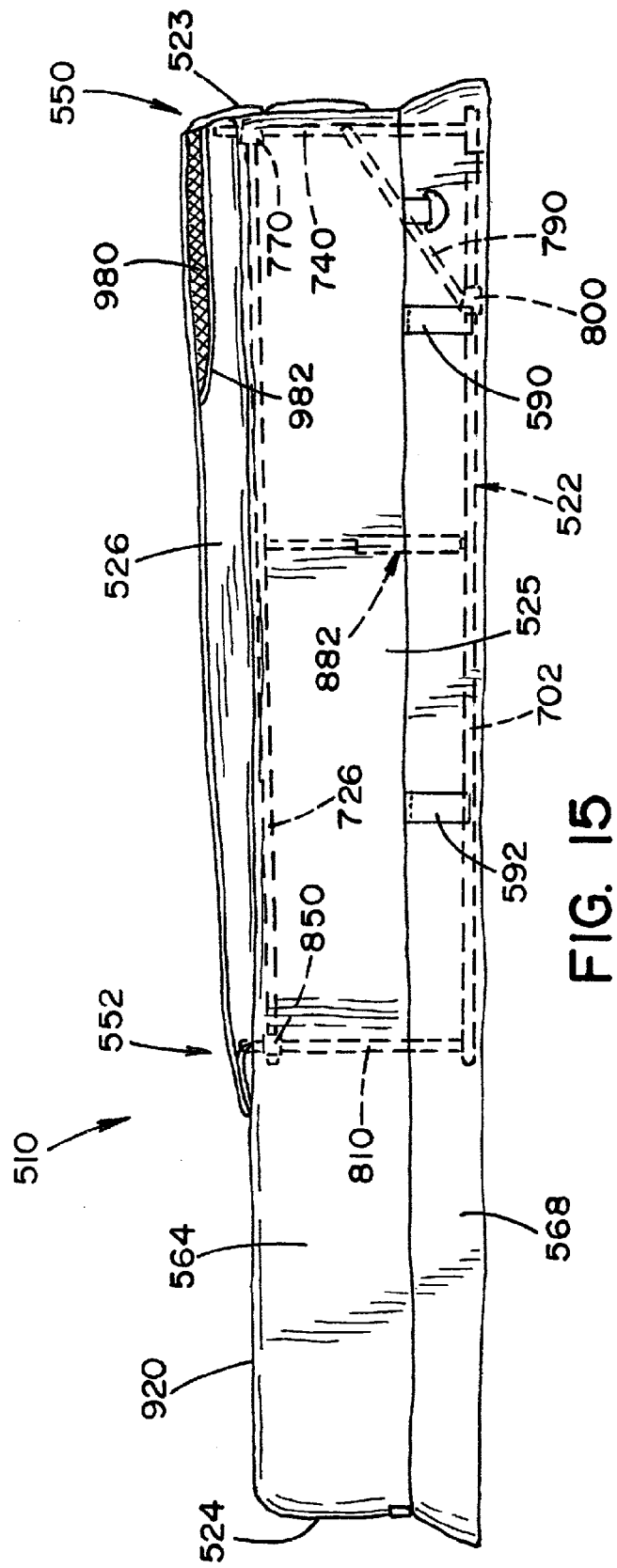
FIG. 15 is a left side elevational view of the one man layout blind shown in FIG. 12.
Figure 16:
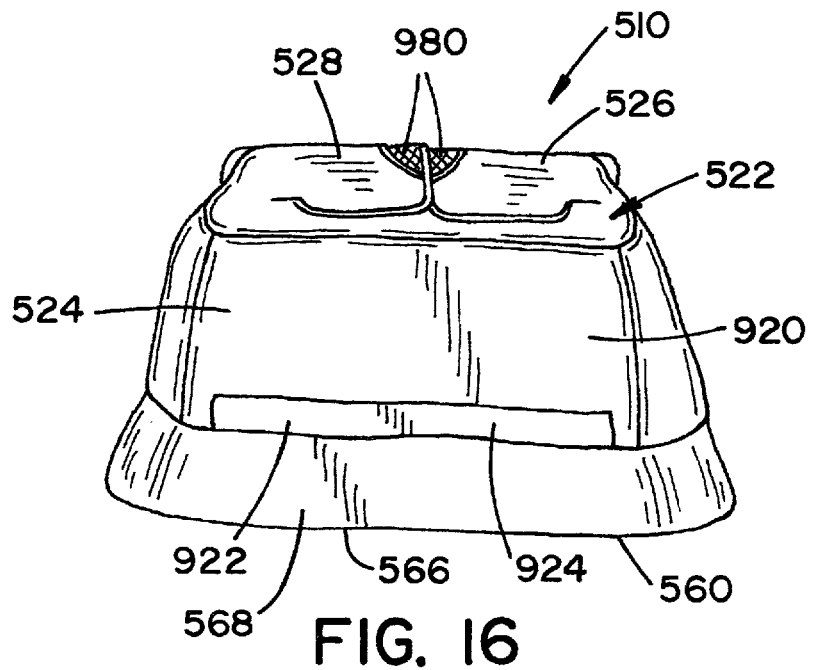
FIG. 16 is a front elevational view of the one man layout blind shown in FIG. 12.
Figure 17:
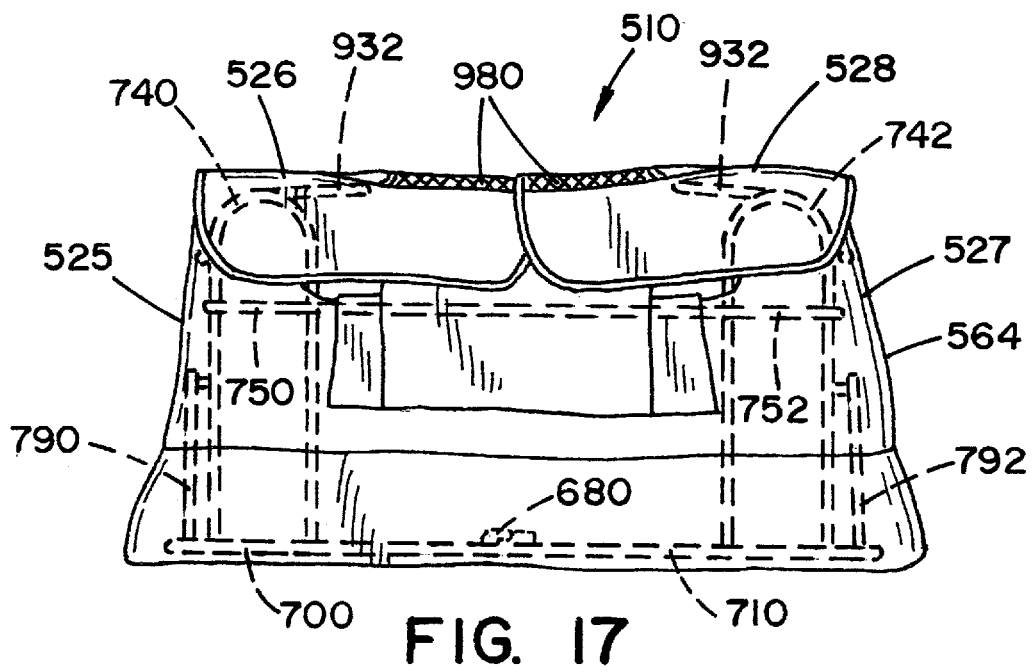
FIG. 17 is a rear elevational view of one two man layout blind shown in FIG. 12.
Figure 18:
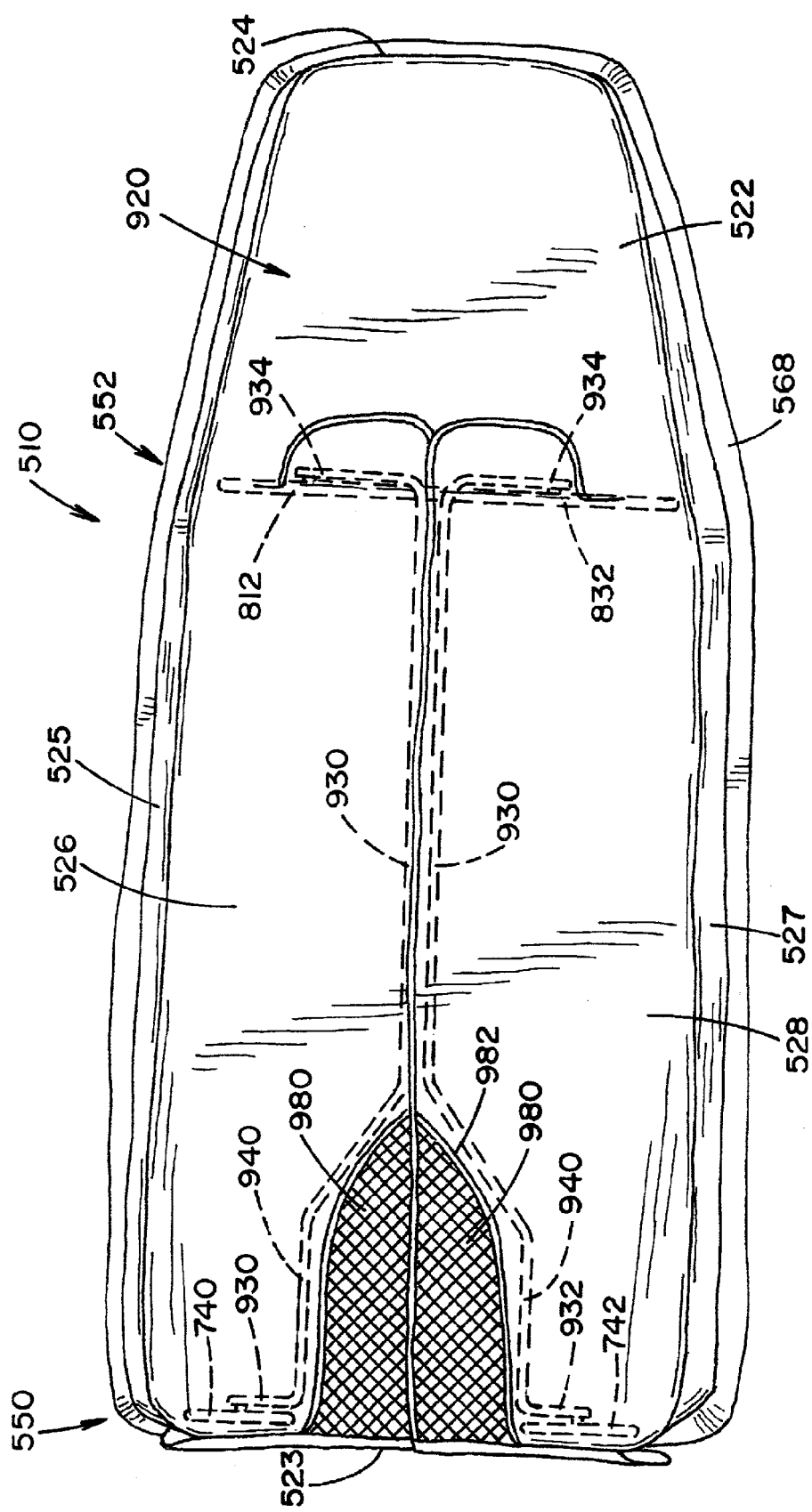
FIG. 18 is a top view of the one man layout blind shown in FIG. 12.
Figure 19:
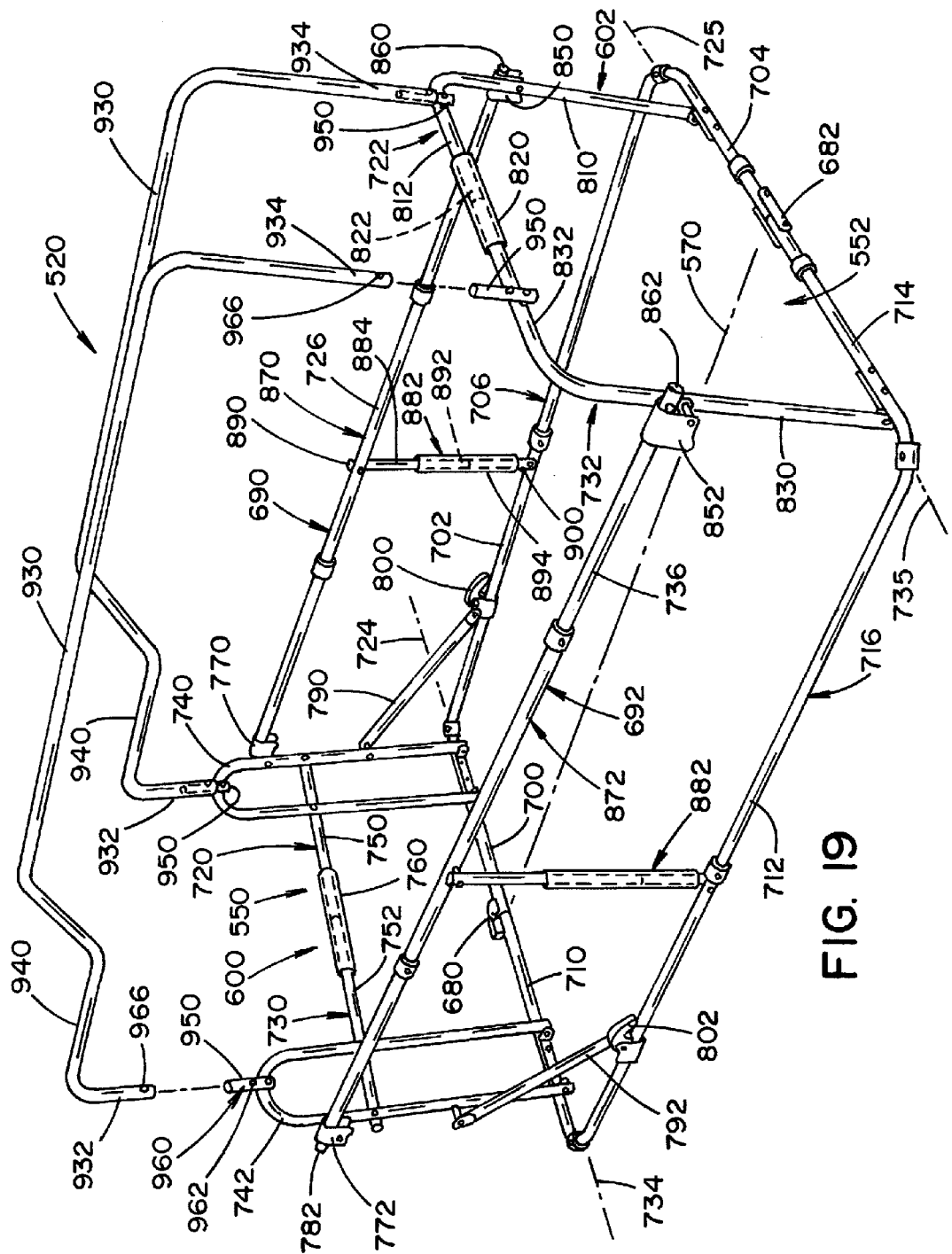
FIG. 19 is a top, front side perspective view of an inner frame, partially exploded, of the layout blind shown in FIG. 12 in a unfolded or deployed condition with the doors above the frame.
Figure 20:
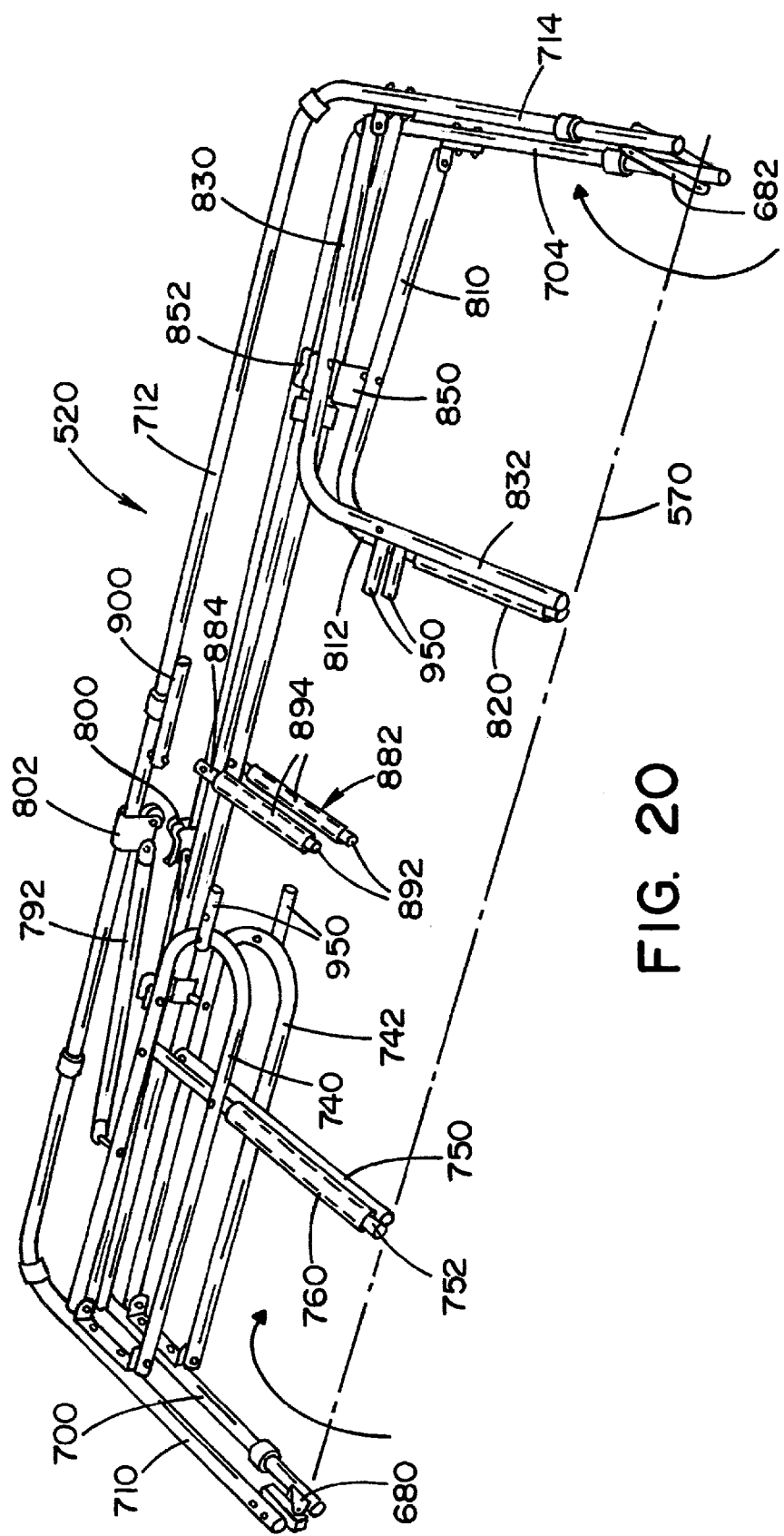
FIG. 20 is a top side perspective view of the inner frame shown in FIG. 19 in shown in a fully folded or transportable condition.
Figure 21:
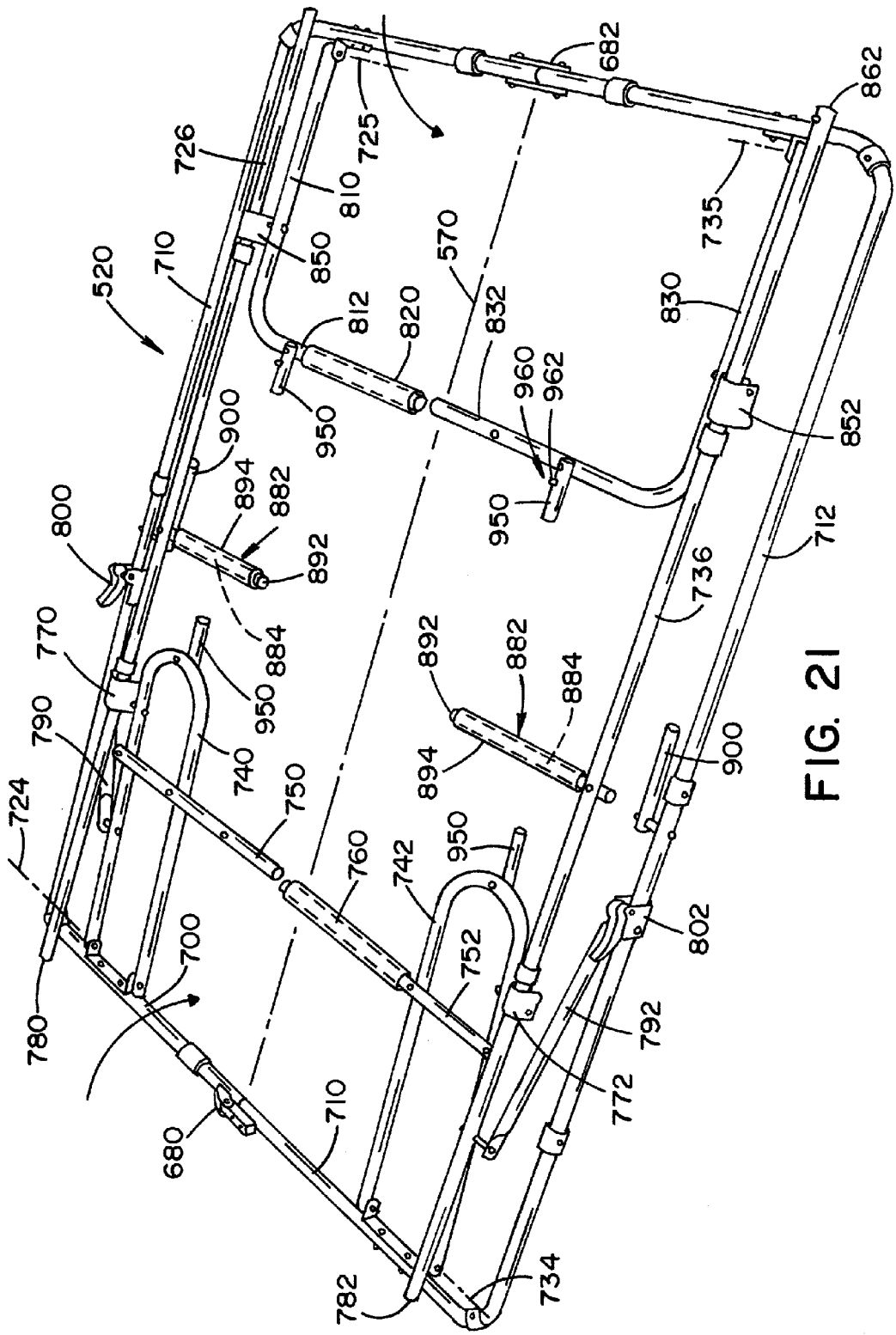
FIG. 21 is a top side perspective view of the inner frame shown in FIG. 19 in shown in a partially unfolded condition.
Figure 22:
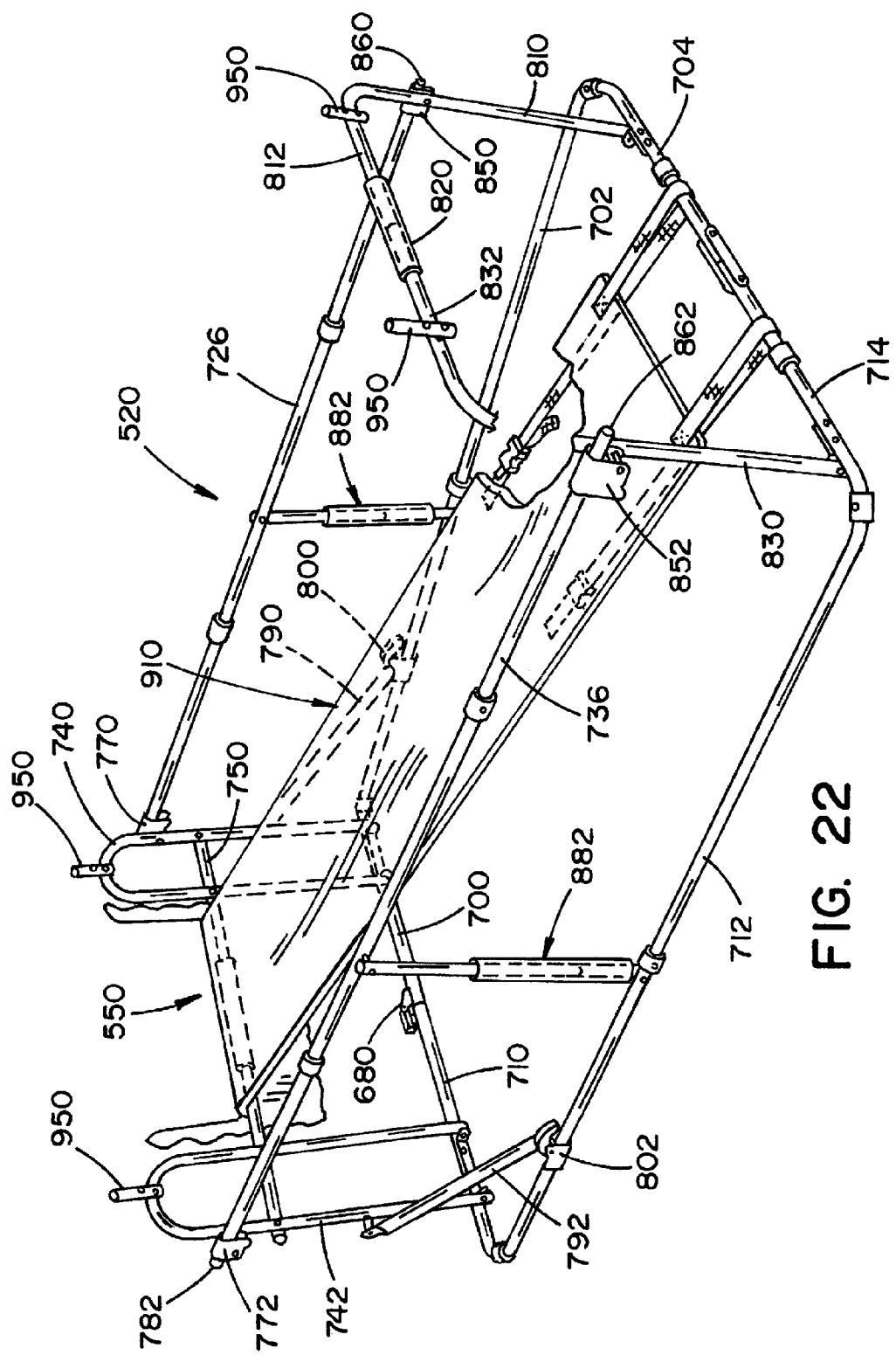
FIG. 22 is a top, front side perspective view, of the inner frame shown in FIG. 19 that includes the seat arrangement in place.

With reference to FIGS. 12-23, shown is blind 510 that includes an inner frame structure 520, an outer cover 522, and doors 526 and 528 pivotably connected to the inner frame structure. As with outer cover 22 above, outer cover 522 of layout blind 510 can utilize any surface configurations known in the art, including camouflage patterns. However, this application is not to be limited to a particular camouflage pattern and could be utilized with a wide-range of camouflages, prints and colors. As is known in the art, camouflage and/or prints can change based on a wide-range of factors, including seasonal changes and specialized camouflages relating to a particular geographic region. Cover 522 extends from a head end or extent 523 to a foot extent 524 and between a left side extent 525 and a right side extent 527.

One man hunting blind 510 is also a two-door arrangement, but where the one compartment has both doors. However, blind 510 does not include a central frame structure Outer cover 522 of the invention of this application can also include a wide range of features including, but not limited to, any features known in the art. One aspect of the invention of this application is the inclusion of a waterproof bottom layer 560 that is specifically designed to be rugged and prevent the egress of water into the blind. As is known in this field, hunting blinds are often deployed in wet environments wherein it has been found that there is a need to prevent this water from entering the blind; especially since the hunter is laying in the blind and often lays in the blind for long periods of time. Further, waterproof layer can include waterproof side extensions 562 that extend up sides 564 of cover 522 wherein the layout blinds of this application can have a waterproof layer that is several inches above a bottom surface 566 of the blind. Upper portions of the cover can include the use of materials that breathe and/or openings to prevent the hunter from getting too hot.

Inner frame 520 along with the arrangement of cover 522 are configured to allow hunting blind 510 to be folded into a compact folded or transportable condition or configuration to allow the hunter to transport the hunting blind into and out of the field. When in this form, the hunting blind is folded at least generally about a central frame axis 570 that is general parallel to hunting direction wherein the hunting direction is again defined by the alignment of the hunters when they are laying in the hunting blind. However, with the one-man hunting blind, the central axis is generally in the middle of the single hunter positions.

In greater detail, frame 520 does not include a central frame, but extends from a head end 600 in headboard region 550 to a rear end 602 at rear region 552. Inner frame 520 includes a first outer frame structure 690 and a second outer frame structure 692. Inner frame 520 further includes head side joint 680 and rear side joint 682 that pivotably join first and second outer frame structures 690 and 692 to one another and which results in a folding arrangement similar to that discussed above with respect to the two-man blind. Pivot joints can be any pivot joints known in the art that allow selective pivoting of outer frame structures relative to one another about at least generally about a central axis 570. As a result, both the first and second outer frame structures can be folded relative to the central axis to fold the hunting blind into the folded or transportable condition or configuration.

As with the outer frame structures above, outer frame structures 690 and 692 are configured to both pivot relative to the central axis and to include head and rear pivot assemblies to allow the outer frame structures to fold flat and to deploy such that they form an upper frame structure. More particularly, first outer frame structure 690 includes a first lower head tube 700, a first lower side tube 702 and a first lower rear tube 704 thereby forming a first U-shaped lower tube assembly 706. Assembly 706 can be a single tube formed into the U-shape or can be an assembly of components forming the U-shape. Similarly, second outer frame structure 692 includes a second lower head tube 710, a second lower side tube 712 and a second lower rear tube 714 thereby forming a second U-shaped lower tube assembly 716. Again, this tube assembly can be a single tube formed into the U-shape or can be an assembly of components forming the U-shape. However, first outer frame structure 690 is pivotably connected to directly to second outer frame structure 692. In this respect, first lower head tube 700 is pivotably joined to second lower head tube 710 by joint 680 and first lower rear tube 704 is pivotably joined to second lower rear tube 714 by joint 682. Again, this structure forms a rigid base structure for the hunting blind. It has been found that this is a solid foundation for the hunting blind that can be folded quickly in the field without any tools, clips, clamps or fasteners. Further, the pivot points of the outer frame structures can pivot generally about the central frame axis to allow the two sections to fold flat to one another for easier transportation of the blind.

Outer frame assemblies 690 and 692 further include upper assemblies, which create the upper portions of the hunting blind that pivot relative to these structures and pivot separate from one another to allow the blind to be folded up. In this respect, first outer frame structure 690 includes a first head side pivotable frame structure 720 and a first rear pivotable frame structure 722. First head side pivotable frame structure 720 being pivotable about a first head axis 724 that is transverse to central frame axis 570. First rear pivotable frame structure 722 being pivotable about a first rear axis 725 that is also transverse to central frame axis 570. Both pivot relative to first U-shaped lower tube assembly 706. In addition, first head side structure 720 and first rear structure 722 join and support a first upper side tube 726 that will be discussed more below. Similarly, second outer frame structure 692 includes a second head side pivotable frame structure 730 and a second rear pivotable frame structure 732. Second head side pivotable frame structure 730 being pivotable about a second head axis 734 that is transverse to central frame axis 570. Second rear pivotable frame structure 722 being pivotable about a second rear axis 725 that is also transverse to central frame axis 570. Both pivot relative to second U-shaped lower tube assembly 716. In addition, second head side structure 730 and second rear structure 732 join and support a second upper side tube 736 that also will be discussed more below.

Turning to the head side pivotable frame structures 720 and 730, these are similar to the structures discussed above and are pivotable in the hunting direction from a generally upward position, which is a deployed condition, to a folded condition, which is the transportable position, wherein the structures are general laying on outer frame structures 690 and 692, respectively. Head side pivotable frame structures 720 and 730 include first and second upward extension 740 and 742, respectively, that are pivotably joined to first and second lower head tubes 700 and 710, respectively. First upward extension 740 includes a first upper head tube 750 that is generally parallel to first lower head tube 700 and second upward extension 742 includes a second upper head tube 752 that is generally parallel to second lower head tube 710. First upper head tube 750 further includes a head locking retention sleeve 760 that is shaped to interengage with second upper head tube 752 since this blind does not have a central frame structure. However, while locking retention sleeve is shown as being joined to first upper head tube 750, it could be joined to second upper head tube 752 without detracting form the invention of this application. Again, the locking sleeves of this application are tubular members that slide axially along the tube in which it is connected. This axial sliding action can be used to slide the tube into engagement with a corresponding sleeve receiver or tube that is a tube of similar diameter than the tube in which the sleeve is secured. This has been found to be an effective joining arrangement wherein a hunter can easily connect two parallel tubes and secure the tubes relative to one another even with gloves on. In order to secure the first upper head tube 750 to the second upper head tube 752, the user merely aligns first upper head tube 750 with second upper head tube 752 and then slides head locking retention sleeve 760 over the second upper head extension tube.

Head side pivotable frame structures 720 and 730 further include first and second head sliding positioning sleeves 770 and 772, respectively, that join first and second upper side tube 726 and 736, respectively, relative to the head frame structures. These head sliding positioning sleeves are pivotably joined to the respective head frames such that when the head frame is pivoted, the head sliding sleeves pivot and the sliding positioning sleeves slide along the upper side tubes. When the head frame is in the upper position or deployed condition, the sleeves are near head ends 780 and 782 of upper side tubes 726 and 736, respectively. As the head frames are folded into the transportable condition, sliding positioning sleeves slide along upper side tubes 726 and 736 away from head ends 780 and 782, respectively. Head side pivotable frame structures 720 and 730 can further include first and second head cross members 790 and 792, respectively. The cross member can be used to help lock the head side frame structures in upward or deployed position. More particularly, first cross member 790 can extending between first upward extension 740 and first lower side tube 702 wherein first cross member 790 can be pivotably attached to first upward extension 740 and slidingly attached to first lower side tube 702 by way of a first slide lock or thumb latch 800. First slide lock or thumb latch 800 can be selectively lockable relative to first lower side tube 702 wherein first upward extension 740 can be locked into the upward position by latch 800 after it is rotated to that position. Then, when the blind is to be collapsed, the latch can be unlatched thereby allowing the upward extension to pivot relative to lower tube assembly 706 as thumb latch 800 slides along side tube 702. Second cross member 792 can extending between second upward extension 742 and second lower side tube 712 wherein second cross member 792 can be pivotably attached to second upward extension 742 and slidingly attached to second lower side tube 712 by way of a second slide lock or thumb latch 802. Second slide lock or thumb latch 802 can be selectively lockable relative to second lower side tube 712 wherein second upward extension 742 can be locked into the upward position by latch 802 after it is rotated to that position. Then, when the blind is to be collapsed, the latch can be unlatched thereby allowing the upward extension to pivot relative to lower tube assembly 716 as thumb latch 802 slides along side tube 712.

As with the head side frame structure, rear pivotable frame structures 722 and 732 are also pivotable in the hunting direction and towards and away from the corresponding u-shaped outer frame structures 706 and 716, receptively. In the embodiments shown, rear pivotable frame structures 722 and 732 are generally L-shaped and extend from a pivotal base near the corner of the outer frame structures 706 and 716. In greater detail, first rear pivotable frame structure 722 includes a first base leg 810 and a first distal leg 812 that together form the L-shape. As with other components of the frame of this application, these legs can be formed from tubular members and can be a single tubular member or an assembly without detracting from the invention of this application. It is preferred that this structure is formed from a single tubular member. First rear pivotable frame structure 722 further includes a rear locking retention sleeve 820 slidingly joined to a distal end 822 of distal leg 812. Similarly, second rear pivotable frame structure 732 includes a second base leg 830 and a second distal leg 832 that together form the L-shape. In this set of embodiments, rear locking retention sleeve 820 is shaped to interengage with second distal leg 832 of second rear pivotable frame structure 732 wherein this engagement helps secure the rear pivotable frame structures 722 and 732 relative to one another in that there is no central frame structure. Again, the locking sleeves of this application are tubular members that slide axially along the tube in which it is connected. This axial sliding action can be used to slide the tube into engagement with another frame tube or sleeve receiver that is a similar diameter than the tube in which the sleeve is secured. In order to secure the first distal leg 812 to second distal leg 832, the user merely aligns the first distal leg 812 with second distal leg 832 and then slides rear locking retention sleeve 820 over second distal leg 832.

Rear side pivotable frame structures 722 and 732 further include first and second rear sliding positioning sleeves 850 and 852, respectively, that join first and second upper side tube 726 and 736, respectively, relative to the rear frame structures. These rear sliding positioning sleeves are pivotably joined to the respective base legs 810 and 830 of the rear frames such that when the rear frame is pivoted, the rear sliding sleeves pivot and the sliding positioning sleeves slide along the upper side tubes. When the rear frame is in the unfolded position or deployed condition, the sliding sleeves are near rear ends 860 and 862 of upper side tubes 726 and 736, respectively. As the rear frames are folded into the transportable condition, sliding positioning sleeves 850 and 852 slide along upper side tubes 726 and 736 away from rear ends 860 and 862, respectively. The locking cross members of the head side pivotable frame structures 720 and 730 can help lock the rear frame structure in the upward position in combination with rear locking retention sleeve 320 and 340.

As a result of this configuration, the outer frame structures can include both a U-shape lower frame assemblies 706 and 716 and U-shape upper frame assemblies 870 and 872 respectively. In the embodiments shown, first upper frame assembly 870 is formed by first upper head tube 750, first upper side tube 726 and first distal leg 812. Similarly, second upper frame assembly 872 is formed by second upper head tube 752, second upper side tube 736 and second distal leg 832. Upper frame assemblies 870 and 872 are joined relative to one another directly by locking retention sleeves 760 and 820.

Yet further, the inner frame structure or arrangement 520 can include one or more vertical support members that can provide support for upper frame members and/or help lock the frame assembly in the deployed condition. In this respect, first outer second frame structures 690 and 692 can include one or more selectively securable vertical support members 882 extending between the upper and lower tubes of the assemblies. With reference to first frame structure 690, vertical support member 882 can extend between first lower side tube 702 and first upper side tube 726. However, in that tubes 702 and 726 must move relative to one another when the frame is deployed or folded up, these members are selectively engageable. In a preferred embodiment, support members 882 are formed by a support tube 884 pivotable having a base end 890 and a distal end 892 wherein base end 890 is pivotably joined to one of tubes 702 and 726. The distal end includes a locking retention sleeve 894. The other of tubes 702 and 726 include a sleeve receiver 900 and locking retention sleeve 892 is slidable on tube 884 and shaped to engage sleeve receiver 900. Accordingly, after the frame is unfolded and set into the deployed condition, locking retention sleeve 894 can be slid into receiver 900. This arrangement can be used to provide vertical support for the upper tube and/or can be utilized to help maintain the frame structure in the deployed condition. The same vertical support member 882 can be used on assembly 692. In a preferred embodiment, support tube 884 has a length such that distal end 892 is closely spaced to sleeve receiver 900 such that distal end 892 engages sleeve receiver 900 when any weight is applied to upper side tubes 726 and 736, such as when the hunter pushes on the upper side tubes to get out of the hunting blind.

The hunting blinds of this application can further include floating seat arrangements 910 that provides floating back and head support for the hunter. The seat arrangement can extend between upper head tubes 750 and 752 and lower rear tubes 704 and 714, respectively. Seat arrangement can be selectively secured to at least one of these tubes to allow the frame to be folded into the transportable condition. This can be done with any fastening systems known in the art including, but not limited to, hook and loop style fastening systems and locking straps, which have been found to provide an effective selective fastening arrangement for these seat structures. Further, floating seat arrangements 910 can help secure cover 522 relative to inner frame 520 to help maintain the alignment of the cover relative to the frame. In this respect, seat arrangements 910 can include a pair of adjustable locking straps 912 that are selectively engageable with clips 914 underneath the floating seat that wrap about lower rear tubes 704 and 714. Upper seat portion 915 of the seat arrangement can wrap about upper head tubes 750 and 752 and be joined to the outer cover a cover seat joint 916. Cover 522 can further include one or more cover straps (not shown) to help secure the cover to the frame. Seat straps 912 allow the seat to be adjusted as desired by the hunter to create a desired amount of support and to tighten the connection between the cover and the frame. In that this seat portion is both padded and floating, it has been found that the seat provides a comfortable and supportive seat structure for the hunter. The upper portion of the floating seat can includes a padded section that extends over the head board locking tube for head support.

Again, blind 510 includes an inner frame sized for the upper torso portion of the hunter and general extends to the "rear" of the hunter. Accordingly, the blind of this application further in includes a foot bag 920 extending past the rear end of the inner frame and between rear region or end 552 and foot extent 524. The foot bag extends from the frame and allows for the coverage of the hunter's legs without adversely adding to the length and weight of the overall frame. In operation, for all blinds of this applicant, the seat portion extends along the majority of the entire frame's length and the hunter's legs extend through and past rear pivotable frame structures 722 and 732 and toward foot extent 524. As a result, the frame portion can be reduced in size and still be used in connection with taller hunters. The foot bag can also include a selectively openable section 922 that allows the foot bag to be easily cleaned out after use. In one embodiment, selectively openable section 922 is formed by a zippered section and the zippered section is covered by flap 924.

Hunting blind 510 further includes one or more doors. In a preferred embodiment, blind 510 also includes two doors, namely, doors 526 and 528. While a wide range of door frames can be used without detracting from the invention of this application, the doors can be formed by generally U-shape bars to provide a desired amount of rigidity. Further, while not shown, the one man blind could include a single door arrangement. The door bars can be wrapped with any fabric known in the industry and any fabric pattern known in the industry. This can include fabric that follows the fabric used for outer cover 522. With reference to door 526, the door includes a door bar 930 that extends from a first bar end 932 to a second bar end 934. While bar 930 is generally U-shaped, it can include a recessed portion 940, which will be discussed more below. Once the inner assembly is assembled into the deployed condition, door 526 can be secured relative to the frame structure and the door can add additional structure to the inner frame assembly. In greater detail, inner frame 520 includes two door mounts 950 for door 526 and these are joined relative to the frame and allow pivoting action of the door relative to the frame. In the preferred embodiment, door mounts 950 are joined relative to distal leg 812 and upward extension 740. Door mounts 950 can include a wide range of fastening arrangements to adequately secure the door bar to the inner frame. As is shown, door mounts 950 are pivotably attached to the corresponding bar and include a spring loaded ball arrangement 960 wherein a ball 962 extends outwardly from the surface of the mount. First bar end 932 and second bar end 934 include holes 966 shaped to receive ball 962 of arrangement 960. In order to assemble the door, ball 962 is depressed wherein the bar ends are pushed coaxially over mounts 950 until ball 962 is aligned with hole 966 wherein ball 962 moves into the hole and locks the door bar to the mount. When the door is to be removed, ball 962 is again depressed and the door bar is pulled from mount 950. Similarly, inner frame 520 includes two door mounts 950 for door 528 and these are joined relative to the frame and allow pivoting action of the door relative to the frame. In the preferred embodiment, door mounts 950 for door 28 are joined relative to distal leg 832 and upward extension 742.

Again, the door bars of this application are not perfectly U-shaped and can include recessed portions 940. These recessed portions are to allow for head side openings 970 at or near the head ends 972 of the doors. However, in this set of embodiments, a portion of the door bars overlap or engage distal legs 812 and 832 so that they rest on these legs. This provides for a solid closing door arrangement that will not break down over time. Thus, both ends of the door tubes are secured relative to the outer frame, the door can pivot relative to the outer frame and close against the upper portions of the outer frame. Yet further, the attachment of the door tube to the base frame structure increases the structural rigidity of the overall hunting blind by helping lock the rear frame structure to the head side frame structure. Further, doors 526 and 528 can include one or more viewable openings 980 and these are preferably at least near head end 972 of the doors. This opening can be formed by a meshed section near the head end that can be used by the hunter to provide fresh air and/or provide for looking outwardly from the hunting blind when in use. This mesh can include an outer edge wire 982 extending there around that can be a flexible wire which allows the mesh sections to be selectively deformable as is desired by the hunter wherein the deformed sections will maintain their desired shape.

The hunting blind of this application can further include a pair of securing straps 990 and 992 utilized to maintain the hunting blind in the transportable condition. In addition, a shoulder strap 994 can be provided which has a first end 996 connected relative to first outer frame structure 690 and a second end 998 connected to second outer frame structure 692. This configuration both supports the entire frame structure and balances the hunting blind when it is lifted by the shoulder strap. The securing straps can be Velcro securing straps to selectively maintain the hunting blind in the folded or transportable condition.

The hunting blinds of this application can also include other features, such as a selectively openable access opening that can be used by the hunter for a wide-range of functions. This can include, but is not limited to, deploying a hunting or goose flag while the hunter is within the blind.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed.

It is claimed:

1. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising an inner frame having a head extent and a rear extent with sides extending between the head extent and rear extent, the inner frame being sized to allow an associated hunter to lay within the blind and be in close proximity to a top surface opening in the layout hunting blind, the inner frame including a first outer frame structure and a second outer frame structure, the first outer frame structure includes a first lower tube assembly and the second outer frame structures include a second lower tube assembly, the first lower tube assembly includes a first lower head tube, a first lower side tube and a first lower rear tube, the second lower tube assembly includes a second lower head tube, a second lower side tube and a second lower rear tube, the inner frame further including a first and a second lower pivot both generally centered about a central frame axis that is parallel to a hunting direction that is defined by the direction that the associated hunter lays within the hunting blind, the first lower pivot being joined between the first lower head tube and the second lower head tube, the second lower pivot being joined between the first lower rear tube and the second lower rear tube such that the first lower tube assembly folds towards the second lower tube assembly about the central frame axis when the layout hunting blind is folded towards the folded condition, the first outer frame structure further including a first head side pivotable frame structure that is pivotable relative to the first lower tube assembly about a first head axis that is transverse to the central frame axis between a folded condition and an unfolded condition, the second outer frame structure further including a second head side pivotable frame structure that is pivotable relative to the second lower tube assembly about a second head axis that is transverse to the central frame axis between a folded condition and an unfolded condition, at least one of the first and second head side pivotable frame structures including a locking retention sleeve and the locking retention sleeve at least partially maintaining the at least one head side pivotable frame structures in the unfolded condition, the layout hunting blind further including at least one blind door selectively closing the top surface opening, the at least one blind door having a door frame structure and the door frame structure being pivotably attached relative to the inner frame and being pivotable about an axis parallel to the central frame axis.

2. The layout blind of claim 1, wherein the first outer frame structure further includes a first rear pivotable frame structure and the second outer frame structure further includes a second rear pivotable frame structure, the first rear pivotable frame structure being pivotable relative to the first lower tube assembly about a first rear axis that is transverse to the central frame axis between a folded condition and an unfolded condition, the first head axis being spaced from the first rear axis, the second rear pivotable frame structure being pivotable relative to the second lower tube assembly about a second rear axis that is transverse to the central frame axis between a folded condition and an unfolded condition, the second head axis being spaced from the second rear axis, the locking retention sleeve being a first locking retention sleeve, at least one of the first and second rear side pivotable frame structures including a second locking retention sleeve and the second locking retention sleeve at least partially maintaining the at least one rear side pivotable frame structures in the unfolded condition.

3. The layout blind of claim 2, wherein the first head side pivotable frame structure includes a first head sliding positioning sleeve pivotably joined thereto and the first rear pivotable frame structure includes a first rear sliding positioning sleeve pivotably joined thereto, the first outer frame structure further includes a first upper side tube slidably received in the first head sliding positioning sleeve and the first rear sliding positioning sleeve such that the orientation of the first upper side tube is controlled by the first head sliding positioning sleeve and the first rear sliding positioning sleeves wherein the pivoting of the first rear pivotable frame structure and the first head side pivotable frame structure away from each other lifts the first upper side tube away from the first lower side tube and the first upper side tube forming a first top portion edge of the hunting blind when in the unfolded condition, the second head side pivotable frame structure includes a second head sliding positioning sleeve pivotably joined thereto and the second rear pivotable frame structure includes a second rear sliding positioning sleeve pivotably joined thereto, the second outer frame structure further includes a second upper side tube slidably received in the second head sliding positioning sleeve and the second rear sliding positioning sleeve such that the orientation of the second upper side tube is controlled by the second head sliding positioning sleeve and the second rear sliding positioning sleeves wherein the pivoting of the second rear pivotable frame structure and the second head side pivotable frame structure away from each other lifts the second upper side tube away from the second lower side tube and the second upper side tube forming a second top portion edge of the hunting blind when in the unfolded condition.

4. The layout blind of claim 3, wherein at least one of the first lower side tube and the first upper side tube including a pivotably attached first side locking retention sleeve and the other of the first lower side tube and first upper side tube including a first side sleeve receiver, the first side locking retention sleeve being shaped to engage the first side sleeve receiver to secure the first upper side tube relative to the first lower side tube, at least one of the second lower side tube and the second upper side tube including a pivotably attached second side locking retention sleeve and the other of the second lower side tube and second upper side tube including a second side sleeve receiver, the second side locking retention sleeve being shaped to engage the second side sleeve receiver to secure the second upper side tube relative to the second lower side tube.

5. The layout blind of claim 1, wherein the inner frame is sized to allow two associated hunters to lay side-by-side within the hunting blind and be in close proximity to one or more top surface openings in the layout hunting blind.

6. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising and an inner frame including a first outer frame structure and a second outer frame structure, the first outer frame structure includes a first lower tube assembly and the second outer frame structures include a second lower tube assembly, the first and second lower tube assemblies being pivotable relative to one another between a folded condition and an unfolded condition generally about a central frame axis that is parallel to a hunting direction that is defined by the direction that an associated hunter lays within the hunting blind, the first outer frame structure further including a first head side pivotable frame structure that is pivotable relative to the first lower tube assembly about a first head axis that is transverse to the central frame axis between a folded condition and an unfolded condition, the second outer frame structure further including a second head side pivotable frame structure that is pivotable relative to the second lower tube assembly about a second head axis that is transverse to the central frame axis between a folded condition and an unfolded condition, at least one of the first and second head side pivotable frame structures including a locking retention sleeve and the locking retention sleeve at least partially maintaining the at least one head side pivotable frame structures in the unfolded condition, the first outer frame structure further includes a first rear pivotable frame structure and the second outer frame structure further includes a second rear pivotable frame structure, the first rear pivotable frame structure being pivotable relative to the first lower tube assembly about a first rear axis that is transverse to the central frame axis between a folded condition and an unfolded condition, the first head axis being spaced from the first rear axis, the second rear pivotable frame structure being pivotable relative to the second lower tube assembly about a second rear axis that is transverse to the central frame axis between a folded condition and an unfolded condition, the second head axis being spaced from the second rear axis, the locking retention sleeve being a first locking retention sleeve, at least one of the first and second rear side pivotable frame structures including a second locking retention sleeve and the second locking retention sleeve at least partially maintaining the at least one rear side pivotable frame structures in the unfolded condition, the first head side pivotable frame structure includes a first head sliding positioning sleeve pivotably joined thereto and the first rear pivotable frame structure includes a first rear sliding positioning sleeve pivotably joined thereto, the first outer frame structure further includes a first upper side tube slidably received in the first head sliding positioning sleeve and the first rear sliding positioning sleeve such that the orientation of the first upper side tube is controlled by the first head and the first rear sliding positioning sleeves and the first upper side tube is upwardly spaced from the first lower tube assembly when in the unfolded condition, the second head side pivotable frame structure includes a second head sliding positioning sleeve pivotably joined thereto and the second rear pivotable frame structure includes a second rear sliding positioning sleeve pivotably joined thereto, the second outer frame structure further includes a second upper side tube slidably received in the second head sliding positioning sleeve and the second rear sliding positioning sleeve such that the orientation of the second upper side tube is controlled by the second head and the second rear sliding positioning sleeves and the second upper side tube is upwardly spaced from the second lower tube assembly when in the unfolded condition, the first head side pivotable frame structure includes a first upward extension and a first upper head tube transversely mounted relative to the first upward extension such that first upper head tube faces the second head side pivotable frame structure when in the unfolded condition, the second head side pivotable frame structure includes a second upward extension and a second upper head tube transversely mounted relative to the second upward extension such that the second upper head tube faces the first head side pivotable frame structure when in the unfolded condition, the first locking retention sleeve being positioned on the first upper head tube and being axially slidable on the first upper head tube toward the second upper head tube and being configured to secure the first upper head tube relative to the second upper head tube, the first rear side pivotable frame structure includes a base leg and a distal leg fixed relative to the base leg and facing inwardly such that the first distal leg faces the second rear side pivotable frame structure when in the unfolded condition, the second rear side pivotable frame structure includes a second base leg and a second distal leg fixed relative to the base leg and facing inwardly such that the second distal leg aces the first rear side pivotable frame structure when in the unfolded condition, the second locking retention sleeve being positioned on the first distal leg and being axially slidable on the distal leg toward the second distal leg and being configured to secure the first distal leg relative to the second distal leg.

7. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising and an inner frame including a first outer frame structure and a second outer frame structure, the first outer frame structure includes a first lower tube assembly and the second outer frame structures include a second lower tube assembly, the first and second lower tube assemblies being pivotable relative to one another between a folded condition and an unfolded condition generally about a central frame axis that is parallel to a hunting direction that is defined by the direction that an associated hunter lays within the hunting blind, the first outer frame structure further including a first head side pivotable frame structure that is pivotable relative to the first lower tube assembly about a first head axis that is transverse to the central frame axis between a folded condition and an unfolded condition, the second outer frame structure further including a second head side pivotable frame structure that is pivotable relative to the second lower tube assembly about a second head axis that is transverse to the central frame axis between a folded condition and an unfolded condition, at least one of the first and second head side pivotable frame structures including a locking retention sleeve and the locking retention sleeve at least partially maintaining the at least one head side pivotable frame structures in the unfolded condition, the first head side pivotable frame structure includes a first upward extension and a first upper head tube transversely mounted relative to the first upward extension such that first upper head tube faces the second head side pivotable frame structure when in the unfolded condition, the second head side pivotable frame structure includes a second upward extension and a second upper head tube transversely mounted relative to the second upward extension such that the second upper head tube faces the first head side pivotable frame structure when in the unfolded condition, the locking retention sleeve being positioned on the first upper head tube and being axially slidable on the first upper head tube toward the second upper head tube and being configured to secure the first upper head tube relative to the second upper head tube.

8. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising and an inner frame including a first outer frame structure and a second outer frame structure, the first outer frame structure includes a first lower tube assembly and the second outer frame structures include a second lower tube assembly, the first and second lower tube assemblies being pivotable relative to one another between a folded condition and an unfolded condition generally about a central frame axis that is parallel to a hunting direction that is defined by the direction that an associated hunter lays within the hunting blind, the first outer frame structure further including a first head side pivotable frame structure that is pivotable relative to the first lower tube assembly about a first head axis that is transverse to the central frame axis between a folded condition and an unfolded condition, the second outer frame structure further including a second head side pivotable frame structure that is pivotable relative to the second lower tube assembly about a second head axis that is transverse to the central frame axis between a folded condition and an unfolded condition, at least one of the first and second head side pivotable frame structures including a locking retention sleeve and the locking retention sleeve at least partially maintaining the at least one head side pivotable frame structures in the unfolded condition, the inner frame further includes a central frame structure, the central frame structure separating a first hunter position from a second hunter position such that the blind is a two man hunting blind, the central frame structure including an upwardly extending head side tube and an upwardly extending rear side tube, the upwardly extending head side tube including a first sleeve receiver and an oppositely facing second sleeve receiver, the first lower tube assembly being pivotably joined to the head side and rear side tubes on a first side of the central axis, the second lower tube assembly being pivotably joined to an opposite side of the head side and rear side tubes and folding away from the first lower tube assembly between a folded condition and an unfolded condition on a second side of the central axis wherein both the first and second lower tube assemblies general pivot about the central frame axis that is generally in alignment with the central frame, the locking retention sleeve being a first locking retention sleeve and the inner frame further including a second locking retention sleeve, the first locking retention sleeve being fixed relative to the first head side pivotable frame structure, the second locking retention sleeve being fixed relative to the second head side pivotable frame structure, the first locking retention sleeve being slidable relative to the first head side pivotable frame structure and selectively engageable with the first sleeve receiver when in the unfolded condition, the second locking retention sleeve being slidable relative to the second head side pivotable frame structure and selectively engageable with the second sleeve receiver when in the unfolded condition.

9. The layout blind of claim 8, wherein the central frame structure is a rigid and non-foldable structuring including a lower central tube extending between the upwardly extending head side tube and the upwardly extending rear side tube, the central frame structure further including a upper central tube extending between the upwardly extending head side tube and the upwardly extending rear side tube.

10. The layout blind of claim 9, wherein the lower central tube is general in horizontal alignment with the first and second lower tube assemblies.

11. The layout blind of claim 10, wherein the central frame structure further includes at least one support extending between the lower central tube and the upper central tube.

12. The layout blind of claim 9, wherein the first outer frame structure further includes a first rear pivotable frame structure and the second outer frame structure further includes a second rear pivotable frame structure, the first rear pivotable frame structure being pivotable relative to the first lower tube assembly about a first rear axis that is transverse to central frame axis between a folded condition and an unfolded condition, the first head axis being spaced from the first rear axis, the second rear pivotable frame structure being pivotable relative to the second lower tube assembly about a second rear axis that is transverse to central frame axis between a folded condition and an unfolded condition, the second head axis being spaced from the second rear axis, the upwardly extending rear side tube including a third sleeve receivers and an oppositely facing fourth sleeve receiver, the first rear pivotable frame structure including a third locking retention sleeve and the second rear pivotable frame structure including a fourth locking retention sleeve, the third locking retention sleeve being slidable relative to the first rear side pivotable frame structure and selectively engageable with the third sleeve receiver when in the unfolded condition, the fourth locking retention sleeve being slidable relative to the second rear side pivotable frame structure and selectively engageable with the fourth sleeve receiver when in the unfolded condition.

13. The layout blind of claim 12, wherein the first head side pivotable frame structure includes a first head sliding positioning sleeve pivotably joined thereto and the first rear pivotable frame structure includes a first rear sliding positioning sleeve pivotably joined thereto, the first outer frame structure further includes a first upper side tube slidably received in the first head sliding positioning sleeve and the first rear sliding positioning sleeve such that the orientation of the first upper side tube is controlled by the first head and the first rear sleeves and the first upper side tube is upwardly spaced from the first lower tube assembly when in the unfolded condition, the second head side pivotable frame structure includes a second head sliding positioning sleeve pivotably joined thereto and the second rear pivotable frame structure includes a second rear sliding positioning sleeve pivotably joined thereto, the second outer frame structure further includes a second upper side tube slidably received in the second head sliding positioning sleeve and the second rear sliding positioning sleeve such that the orientation of the second upper side tube is controlled by the second head and the second rear sleeves and the second upper side tube is upwardly spaced from the second lower tube assembly when in the unfolded condition.

14. The layout blind of claim 13, wherein the first lower tube assembly includes a first lower side tube and the second lower tube assembly includes a second lower side tube, at least one of the first lower side tube and the first upper side tube including a first side locking retention sleeve and the other of the first lower side tube and first upper side tube including a first side sleeve receiver, the first side locking retention sleeve being shaped to engage the first side sleeve receiver to secure the first upper side tube relative to the first lower side tube, at least one of the second lower side tube and the second upper side tube including a second side locking retention sleeve and the other of the second lower side tube and second upper side tube including a second side sleeve receiver, the second side locking retention sleeve being shaped to engage the second side sleeve receiver to secure the second upper side tube relative to the second lower side tube.

15. The layout blind of claim 13, wherein the first head side pivotable frame structure includes a first upward extension and a first upper head tube transversely mounted relative to the first upward extension such that first upper head tube faces the second head side pivotable frame structure when in the unfolded condition, the second head side pivotable frame structure includes a second upward extension and a second upper head tube transversely mounted relative to the second upward extension such that the second upper head tube faces the first head side pivotable frame structure when in the unfolded condition, the first locking retention sleeve being positioned on the first upper head tube and being axially slidable on the first upper head tube, the second locking retention sleeve being positioned on the second upper head tube and being axially slidable on the second upper head tube, the first rear side pivotable frame structure includes a base leg and a distal leg fixed relative to the base leg and facing inwardly such that the first distal leg faces the second rear side pivotable frame structure when in the unfolded condition, the second rear side pivotable frame structure includes a second base leg and a second distal leg fixed relative to the base leg and facing inwardly such that the second distal leg aces the first rear side pivotable frame structure when in the unfolded condition, the third locking retention sleeve being positioned on the first distal leg and being axially slidable on the first distal leg toward the second distal leg, the fourth locking retention sleeve being positioned on the second distal leg and being axially slidable on the second distal leg toward the first distal leg.

16. The layout blind of claim 8, wherein the central frame structure has a central frame width transverse to the hunting direction, the first side of the central axis and the second side of the central axis are spaced greater than the central frame width such that the first and second outer frame structures fold generally flat onto the central frame structure when in the fold condition.

17. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising an inner frame having an overall frame length between a head extent and a rear extent wherein the rear extent is spaced from the foot end, the inner frame including a first outer frame structure and a second outer frame structure between head and rear extent, the first outer frame structure includes a first lower tube assembly that is generally U-shaped and includes a first lower head tube, a first lower side tube and a first lower rear tube, the second outer frame structure includes a second lower tube assembly that is generally U-shaped and includes a second lower head tube, a second lower side tube and a second lower rear tube, the first and second lower tube assemblies being pivotable relative to one another between a folded condition and an unfolded condition generally about a central frame axis that is parallel to a hunting direction that is defined by the direction that an associated hunter lays within the hunting blind, the first outer frame structure further including a first head side pivotable frame structure that is pivotable relative to the first lower tube assembly about a first head axis that is transverse to the central frame axis between a folded condition and an unfolded condition, the first head side pivotable frame structure includes a first upward extension and a first upper head tube transversely mounted relative to the first upward extension, the second outer frame structure further including a second head side pivotable frame structure that is pivotable relative to the second lower tube assembly about a second head axis that is transverse to the central frame axis between a folded condition and an unfolded condition, the second head side pivotable frame structure includes a second upward extension and a second upper head tube transversely mounted relative to the second upward extension such that the second upper head tube faces the first upper head tube, the first outer frame structure further includes a first rear pivotable frame structure and the second outer frame structure further includes a second rear pivotable frame structure, the first rear pivotable frame structure being pivotable relative to the first lower tube assembly about a first rear axis that is transverse to the central frame axis between a folded condition and an unfolded condition, the first head axis being spaced from the first rear axis, the second rear pivotable frame structure being pivotable relative to the second lower tube assembly about a second rear axis that is transverse to the central frame axis between a folded condition and an unfolded condition, the second head axis being spaced from the second rear axis, the first rear side pivotable frame structure includes a first base leg and a first distal leg fixed relative to the first base leg and facing inwardly such that the first distal leg faces the second rear side pivotable frame structure when in the unfolded condition, the second rear side pivotable frame structure includes a second base leg and a second distal leg fixed relative to the base leg and facing inwardly such that the second distal leg is generally coaxial with the first distal leg of the first rear side pivotable frame structure when in the unfolded condition and the first and second distal legs being selectively securable relative to one another, the blind further including at least one elongated seat extending between at least one of the first and second upper head tubes and at least one of the first and second lower rear tubes, the inner frame further including a first and a second lower pivot both generally centered about the central axis, the first lower pivot being joined between the first lower head tube and the second lower head tube, the second lower pivot being joined between the first lower rear tube and the second lower rear tube such that the first lower tube assembly folds towards the second lower tube assembly about the central frame axis when the layout hunting blind is folded towards the folded condition.

18. The layout blind of claim 17, wherein the blind further includes a foot bag extending from the rear extent configured to cover a portion of associated legs of the associated hunter wherein the associated hunter's buttocks is near the rear extent and a portion of the associated hunter's legs extending outwardly of the inner frame and into the foot bag when laving in the hunting blind.

19. The layout blind of claim 17, wherein the blind further includes an outer cover extending between the head end and the foot end, the least one elongated seat extending being joined to the outer cover and being secured to the at least one of the first and second lower rear tubes, the cover including a foot bag and the foot bag extending outwardly beyond the inner frame such that a portion of the associated hunter's legs extending outwardly of the inner frame and into the foot bag when laying in the hunting blind.

20. The layout blind of claim 17, further including a first and a second locking retention sleeve, the first locking retention sleeve being selectively securable between the first and second upper head tubes and the second locking retention sleeve being selectively securable between the first and second distal legs.

21. The layout blind of claim 17, wherein the first head side pivotable frame structure and the first rear pivotable frame structure are generally in the same plane as the first lower tube assembly when the layout hunting blind is in the folded condition and the first head side pivotable frame structure and the first rear pivotable frame structure pivoting away from each other when being moved into the unfolded condition, the second head side pivotable frame structure and the second rear pivotable frame structure are generally in the same plane as the second lower tube assembly when the layout hunting blind is in the folded condition and the second head side pivotable frame structure and the second rear pivotable frame structure pivoting away from each other when being moved in the unfolded condition, the first head side pivotable frame structure includes a first head sliding positioning sleeve pivotably joined thereto and the first rear pivotable frame structure includes a first rear sliding positioning sleeve pivotably joined thereto, the first outer frame structure further includes a first upper side tube slidably received in the first head sliding positioning sleeve and the first rear sliding positioning sleeve such that the orientation of the first upper side tube is controlled by the first head and the first rear sliding positioning sleeves wherein the pivoting of the first rear pivotable frame structure and the first head side pivotable frame structure away from each other lifts the first upper side tube away from the first lower side tube and the first upper side tube forming a first top portion edge of the hunting blind when in the unfolded condition, the second head side pivotable frame structure includes a second head sliding positioning sleeve pivotably joined thereto and the second rear pivotable frame structure includes a second rear sliding positioning sleeve pivotably joined thereto, the second outer frame structure further includes a second upper side tube slidably received in the second head sliding positioning sleeve and the second rear sliding positioning sleeve such that the orientation of the second upper side tube is controlled by the second head and the second rear sliding positioning sleeves wherein the pivoting of the second rear pivotable frame structure and the second head side pivotable frame structure away from each other lifts the second upper side tube away from the second lower side tube and the second upper side tube forming a second top portion edge of the hunting blind when in the unfolded condition.

22. The layout blind of claim 17, wherein the first lower pivot has two pivot points spaced on either side of the central axis and the second lower pivot has two pivot points spaced on either side of the central axis such that the first outer frame structure and the second outer frame structure fold against each other when the layout hunting blind is folded into the folded condition.

23. A layout hunting blind that can be folded into a compact transportable condition and that is easily assembled or deploy in the field, the layout hunting blind having a head end and a foot end wherein a hunter lays in a hunting direction with the hunter's head near the head end and the hunter's feet near the foot end, the hunting blind comprising and an inner frame having an overall frame length between a head extent and a rear extent wherein the rear extent is spaced from the foot end, the inner frame including a first outer frame structure and a second outer frame structure between head and rear extend, the first outer frame structure includes a first lower tube assembly that is generally U-shaped and includes a first lower head tube, a first lower side tube and a first lower rear tube, the second outer frame structures include a second lower tube assembly that is generally U-shaped and includes a second lower head tube, a second lower side tube and a second lower rear tube, the first and second lower tube assemblies being pivotable relative to one another between a folded condition and an unfolded condition generally about a central frame axis that is parallel to a hunting direction that is defined by the direction that an associated hunter lays within the hunting blind, the first outer frame structure further including a first head side pivotable frame structure that is pivotable relative to the first lower tube assembly about a first head axis that is transverse to central frame axis between a folded condition and an unfolded condition, the first head side pivotable frame structure includes a first upward extension and a first upper head tube transversely mounted relative to the first upward extension, the second outer frame structure further including a second head side pivotable frame structure that is pivotable relative to the second lower tube assembly about a second head axis that is transverse to central frame axis between a folded condition and an unfolded condition, the second head side pivotable frame structure includes a second upward extension and a second upper head tube transversely mounted relative to the second upward extension such that the second upper head tube faces the first upper head tube, the first outer frame structure further includes a first rear pivotable frame structure and the second outer frame structure further includes a second rear pivotable frame structure, the first rear pivotable frame structure being pivotable relative to the first lower tube assembly about a first rear axis that is transverse to the central frame axis between a folded condition and an unfolded condition, the first head axis being spaced from the first rear axis, the second rear pivotable frame structure being pivotable relative to the second lower tube assembly about a second rear axis that is transverse to central frame axis between a folded condition and an unfolded condition, the second head axis being spaced from the second rear axis, the first rear side pivotable frame structure includes a base leg and a distal leg fixed relative to the base leg and facing inwardly such that the first distal leg faces the second rear side pivotable frame structure when in the unfolded condition, the second rear side pivotable frame structure includes a second base leg and a second distal leg fixed relative to the base leg and facing inwardly such that the second distal leg aces the first rear side pivotable frame structure when in the unfolded condition, the blind further including at least one elongated seat extending between at least one of the first and second upper head tubes and at least one of the first and second lower rear tubes, the inner frame further includes a central frame structure, the central frame structure separating a first hunter position from a second hunter position such that the blind is a two man hunting blind, the central frame structure including an upwardly extending head side tube and an upwardly extending rear side tube, the upwardly extending head side tube including a first sleeve receiver and an oppositely facing second sleeve receiver, the first lower tube assembly being pivotably joined to the head side and rear side tubes on a first side of the central axis, the second lower tube assembly being pivotably joined to an opposite side of the head side and rear side tubes and folding away from the first lower tube assembly between a folded condition and an unfolded condition on a second side of the central axis wherein both the first and second lower tube assemblies general pivot about the central frame axis that is generally in alignment with the central frame, the inner frame further including a first locking retention sleeve and a second locking retention sleeve, the first locking retention sleeve being fixed relative to the first head side pivotable frame structure, the second locking retention sleeve being fixed relative to the second head side pivotable frame structure, the first locking retention sleeve being slidable relative to the first head side pivotable frame structure and selectively engageable with the first sleeve receiver when in the unfolded condition, the second locking retention sleeve being slidable relative to the second head side pivotable frame structure and selectively engageable with the second sleeve receiver when in the unfolded condition.

24. The layout blind of claim 23, wherein the upwardly extending rear side tube including a third sleeve receivers and an oppositely facing fourth sleeve receiver, the first rear pivotable frame structure including a third locking retention sleeve and the second rear pivotable frame structure including a fourth locking retention sleeve, the third locking retention sleeve being slidable relative to the first rear side pivotable frame structure and selectively engageable with the third sleeve receiver when in the unfolded condition, the fourth locking retention sleeve being slidable relative to the second rear side pivotable frame structure and selectively engageable with the fourth sleeve receiver when in the unfolded condition.

* * * * *